US011074604B2

(12) United States Patent
Daly, Jr. et al.

(10) Patent No.: US 11,074,604 B2
(45) Date of Patent: Jul. 27, 2021

(54) EDUCATIONAL GUIDE MODULE HAVING A REWARD SYSTEM FOR VIRTUAL STORAGE SYSTEM

(71) Applicant: DigitalMailer, Inc., Herndon, VA (US)

(72) Inventors: Ronald M. Daly, Jr., Centreville, VA (US); Leonard Giambalvo, Fort Mill, SC (US)

(73) Assignee: Virtual Strongbox, Inc., Cornelius, NC (US)

( * ) Notice: Subject to any disclaimer, the term of this patent is extended or adjusted under 35 U.S.C. 154(b) by 0 days.

(21) Appl. No.: 14/595,338

(22) Filed: Jan. 13, 2015

(65) Prior Publication Data

US 2016/0203507 A1 Jul. 14, 2016

(51) Int. Cl.
*G06Q 30/02* (2012.01)
*G06Q 40/02* (2012.01)
(Continued)

(52) U.S. Cl.
CPC ......... *G06Q 30/0226* (2013.01); *G06Q 40/02* (2013.01); *G09B 5/02* (2013.01); *G09B 7/02* (2013.01); *G09B 19/00* (2013.01)

(58) Field of Classification Search
CPC ...... G06Q 30/0226; G06Q 40/02; G09B 5/02; G09B 7/02; G09B 19/00
(Continued)

(56) References Cited

U.S. PATENT DOCUMENTS

| 6,674,992 | B2 * | 1/2004 | Helmick | ............... | G09B 5/00 |
| | | | | | 434/350 |
| 2003/0004909 | A1 * | 1/2003 | Chauhan | ............... | G06N 5/043 |
| | | | | | 706/45 |

(Continued)

FOREIGN PATENT DOCUMENTS

KR 20010070702 A * 7/2001

OTHER PUBLICATIONS

Galen Gruman, Virtualized storage, real rewards, 2006 (Year: 2006).*
Lori Kay Baranek, The Effect of Rewards and Motivation on Student Achievement, 1996 (Year: 1996).*

*Primary Examiner* — Tarek Elchanti
(74) *Attorney, Agent, or Firm* — Brundidge & Stanger, P.C.

(57) ABSTRACT

An educational guide module including a reward system for a virtual storage system in data communication with a user computing device via a communication network, the virtual storage system includes at least one processor receiving from the user computing device, a selection of at least one of an education guide or the reward system corresponding to the virtual storage system, as input by a user, performing at least one instructional guide operation to instruct the user on operation of the virtual storage system, when the education guide is selected, and performing a reward operation to provide a reward to the user when the reward system is selected. The performance of the reward operation includes displaying at least one question to the user, receiving infor- (Continued)

mation input by the user as an answer to the at least one question, storing the information received, and calculating points based on the information received, and wherein the points are used to redeem a reward within the virtual storage system.

9 Claims, 27 Drawing Sheets

(51) Int. Cl.
  *G09B 5/02* (2006.01)
  *G09B 19/00* (2006.01)
  *G09B 7/02* (2006.01)
(58) Field of Classification Search
  USPC ......... 706/45; 705/14.1, 326, 14.31; 463/41; 434/362, 219; 455/557; 700/231; 711/103
  See application file for complete search history.

(56) References Cited

U.S. PATENT DOCUMENTS

| | | | |
|---|---|---|---|
| 2006/0078859 A1* | 4/2006 | Mullin | G03G 15/5016 434/219 |
| 2006/0187193 A1* | 8/2006 | Esquilin | G11B 27/034 345/156 |
| 2007/0174079 A1* | 7/2007 | Kraus | G06Q 10/10 705/3 |
| 2008/0161111 A1* | 7/2008 | Schuman | A63F 13/10 463/41 |
| 2009/0075696 A1* | 3/2009 | Kanapur | G06Q 30/0207 455/557 |
| 2010/0145506 A1* | 6/2010 | Waugh | G06F 19/3462 700/231 |
| 2012/0072655 A1* | 3/2012 | Li | G06F 21/78 711/103 |
| 2013/0030884 A1* | 1/2013 | Faber | G06Q 30/0209 705/14.1 |

* cited by examiner

EDUCATIONAL GUIDE MODULE HAVING A REWARD SYSTEM FOR VIRTUAL STORAGE SYSTEM

CROSS-REFERENCE TO RELATED APPLICATIONS

The present application relates to co-pending application, application Ser. No. 13/751,982 entitled "Virtual Storage System and Method of Copying Electronic Documents into the Virtual Storage System" by Ronald M. Daly, Jr. et al. filed on Jan. 28, 2013; co-pending application, application Ser. No. 13/752,008 entitled "Virtual Storage System and Method of Sharing Electronic Documents within the Virtual Storage System" by Ronald M. Daly, Jr. et al. filed on Jan. 28, 2013; co-pending application, application Ser. No. 13/752,023 entitled "Virtual Storage System and File Encryption Methods" by Ronald M. Daly, Jr. et al. filed on Jan. 28, 2013; co-pending application, application Ser. No. 13/752,043 entitled "Virtual Storage System and File Storing Method" by Ronald M. Daly, Jr. et al. filed on Jan. 28, 2013; and co-pending application, application Ser. No. 13/948,194 entitled "Virtual Storage System and Method of Sharing Access to the Virtual Storage System for Adding Electronic Documents" by Ronald M. Daly, Jr. et al. filed on Jul. 23, 2013, the entire disclosures of which are incorporated herein by reference.

BACKGROUND OF THE INVENTION

1. Field of the Invention

The present invention relates to a virtual storage system. More particularly, the present invention relates to an educational guide module having a reward system for a virtual storage system for managing electronic documents within the virtual storage system.

2. Description of the Related Art

Virtual storage systems have become a popular alternative for storing files, thereby eliminating the need to install physical storage devices and minimizing file storage costs. A virtual storage system is an online storage system where data is stored in virtual storage pools. The pools are hosted by third parties that operate large data centers. The third parties virtualize resources in servers and present the resources as virtual storage pools for users to store files, for example. The virtual storage system is accessed through a web application programming interface (API), a gateway or a Web-based user interface (UI), for example. A typical virtual storage system (e.g., a cloud-type storage system) has several disadvantages which create security concerns. For example, the storage location of the files stored therein may be unknown to both third party hosting companies and/or users of the virtual storage system. In addition, the typical virtual storage system can be easily accessed over a communication network (e.g., the Internet) using simple single-factor authentication processes for access thereof. The typical virtual storage system does not encrypt files that are stored on their servers which makes the files easily visible to internal employees and hackers. Further, the typical virtual storage system is not Pci compliant (PCI DSS) a proprietary information security standard for organizations that handle cardholder information for the major debit, credit, prepaid, e-purse, ATM, and POS cards. Further, once any file is stored on the virtual storage system they become property of the virtual storage system provider and are no longer user-owned; therefore the files can be used for other purposes, such as data mining without user permission.

Online banking systems provide resources to enable users to conduct banking transactions electronically from a personal computer, for example. These banking transactions include monitoring accounts, conducting money transfers, applying for loans, submitting loan payments, etc. However, users are required to visit the bank in person, to conduct other transactions such as depositing important documents into a safe deposit box which is an individually secured container held in a bank vault. The safe deposit box is used for storing valuable possessions, such as jewelry, currency, marketable securities, and important documents (e.g., bank statements, wills, passports, property deeds, insurance policies, photographs and birth certificates). Bank personnel typically open the bank vault with a key and a user is required to produce an assigned key to open the safe deposit box.

Currently, online banking systems fail to allow users to store important documents electronically, and also fail to allow users to retrieve, view or share these documents electronically outside of the bank environment, when desired.

SUMMARY OF THE INVENTION

The present invention provides an educational guide module including a reward system, for managing electronic documents within a virtual storage system.

According to one or more embodiments, the present invention provides an educational guide module that comprises an education wizard including one or more instructional guide operations, for example, for granting share access to third party persons to the user-owned virtual storage system and for adding and deleting electronic documents within the virtual storage system, as desired. According to one or more embodiments, the educational guide module of the present invention further provides a reward system within the virtual storage system that enables a user to accumulate points or keys upon completion of one or more tasks (e.g., questions) to be used to redeem a reward within the virtual storage system.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto, wherein in the following brief description of the drawings:

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Specific details are given in the following description to provide a thorough understanding of the embodiments. However, it will be understood by one of ordinary skill in the art that the embodiments may be practiced without these specific details. For example, systems, networks, processes, and other components may be shown as components in block diagram form in order not to obscure the embodiments in unnecessary detail. Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The present invention as will be described in greater detail below provides an educational guide module and method, and a method for a reward system within the virtual storage system. The present invention provides various embodiments as described below. However it should be noted that the present invention is not limited to the embodiments described herein, but could extend to other embodiments as would be known or as would become known to those skilled in the art.

Figure 1:
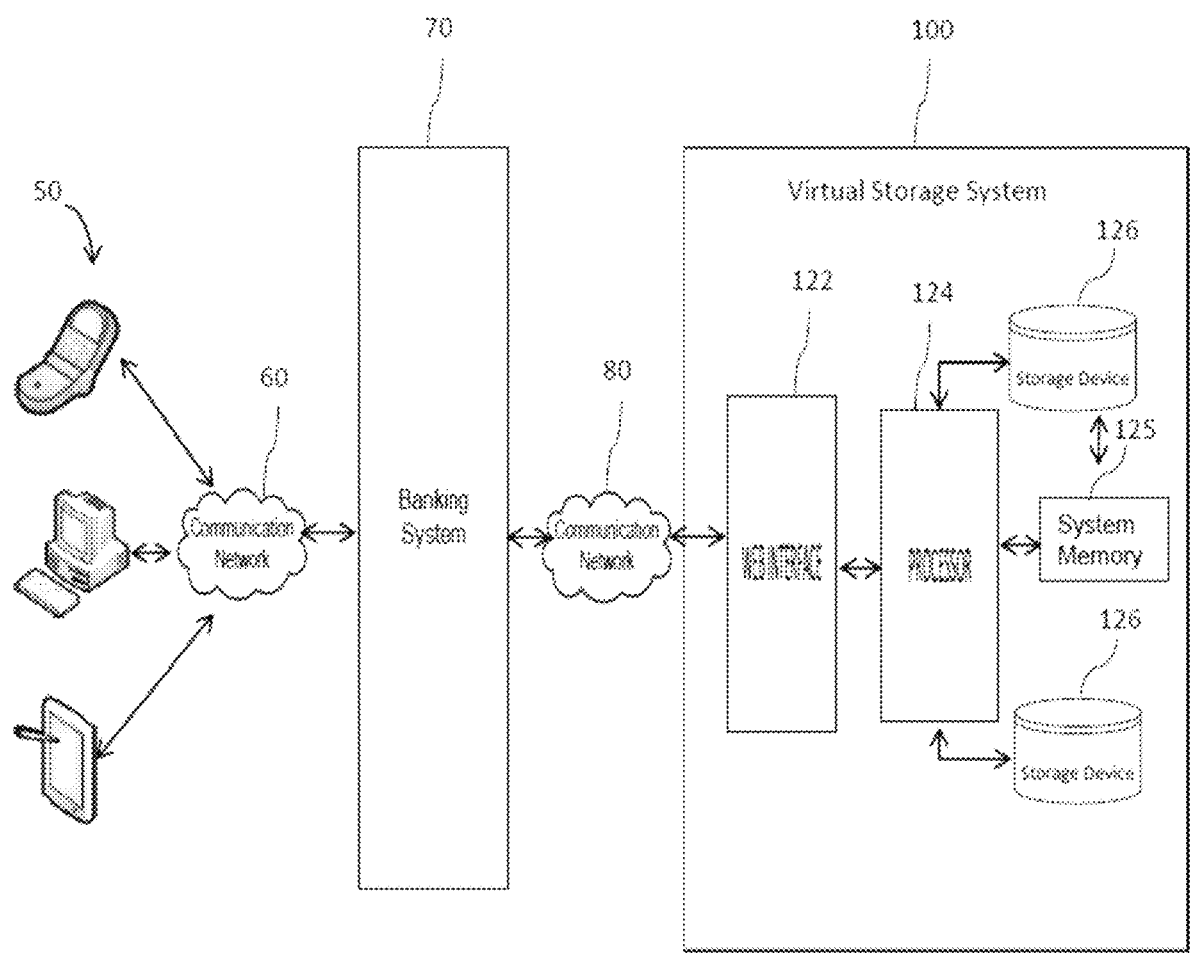
FIG. 1 is a block diagram of a virtual storage system that can be implemented within one or more embodiments of the present invention.

FIG. 1 is a block diagram of a virtual storage system implemented within one or more embodiments of the present invention. In FIG. 1, a user at a user computing device 50 is configured to access, via a communication network 60, an external system i.e., an online document retrieval and storage system such as a banking system 70, to perform online banking transactions, such as viewing bank accounts and bank statements, applying for loans, and other transactions. According to one or more embodiments, the user computing device 50 includes at least one of a mobile phone or smart phone, a personal computer or laptop, a personal digital assistant (PDA), or tablet. The present invention is not limited to any particular type of user computing device 50, and may vary accordingly.

The user accesses the banking system 70 by inputting input data including identification and log-in information such as a user ID and password via a user interface (UI) of the user computing device 50. Once the identification/log-in information is received at a banking application of the banking system 70, the banking system 70 retrieves the user's banking information and displays the banking information via a display of the user computing device 50. The banking system 70 is configured to receive the input data and provide the user with electronic documents (e.g., bank statements) in webpage format or any other format over the communication network 60. The banking system 70 communicates via a communication network 80, with a virtual storage system 100 described in detail below.

The communication networks 60 and 80 include a wired or wireless network for data communication. The data communication across the communication networks 60 and 80 is achieved by using web services technology including for example, Web services Description Language (WSDL). The communication networks 60 and 80 may include any subsystem for exchanging data such as the Internet, intranet, extranet, wide area network (WAN), local area network (LAN), Restful web services, JAVAScript Object Notation (JSON), Extensible Mark-up Language (XML)-based communication network, Simple Object Access Protocol (SOAP)-based Services and satellite communication network. Further, the communication networks 60 and 80 can be other types of networks such as interactive television (ITV). According to one or more embodiments, the communication networks 60 and 80 may be the same or different types of networks.

The virtual storage system 100 is a user-specific storage system which allows each user to have a secure access to their files stored within the virtual storage system 100. In addition, the virtual storage system 100 encrypts each electronic document as it is retrieved from the external system, and only the user-owner can access the electronic document thereby leaving ownership of the files within the virtual storage system 100 with the user-owner at all times.

According to one or more embodiments, the virtual storage system 100 includes a web interface 122 for interfacing with the external system (e.g., the banking system 70) over the communication network 80. The web interface 122 provides secure connection to the virtual storage system 100. According to one or more embodiments, the web interface 122 is a specifically-designed application programming interface (API), for example, which performs authentication of the user or the external system (e.g., the banking system 70) at multiple levels. A secure connection is made between the banking system 70 and the virtual storage system 100 on a transport layer level, for example. According to one or more embodiments, a transport layer security (TLS) or secure sockets layer (SSL) cryptographic protocol may be employed to provide secure communication over the communication networks 60 and 80. According to one or more embodiments, the web interface 122 is a web application programming interface (API), a gateway or a Web-based user interface (UI), for example.

According to one or more embodiments, the virtual storage system 100 is Pci compliant to allow storage of cardholder information for major debit, credit, prepaid, e-purse, ATM and POS cards.

Figure 9:
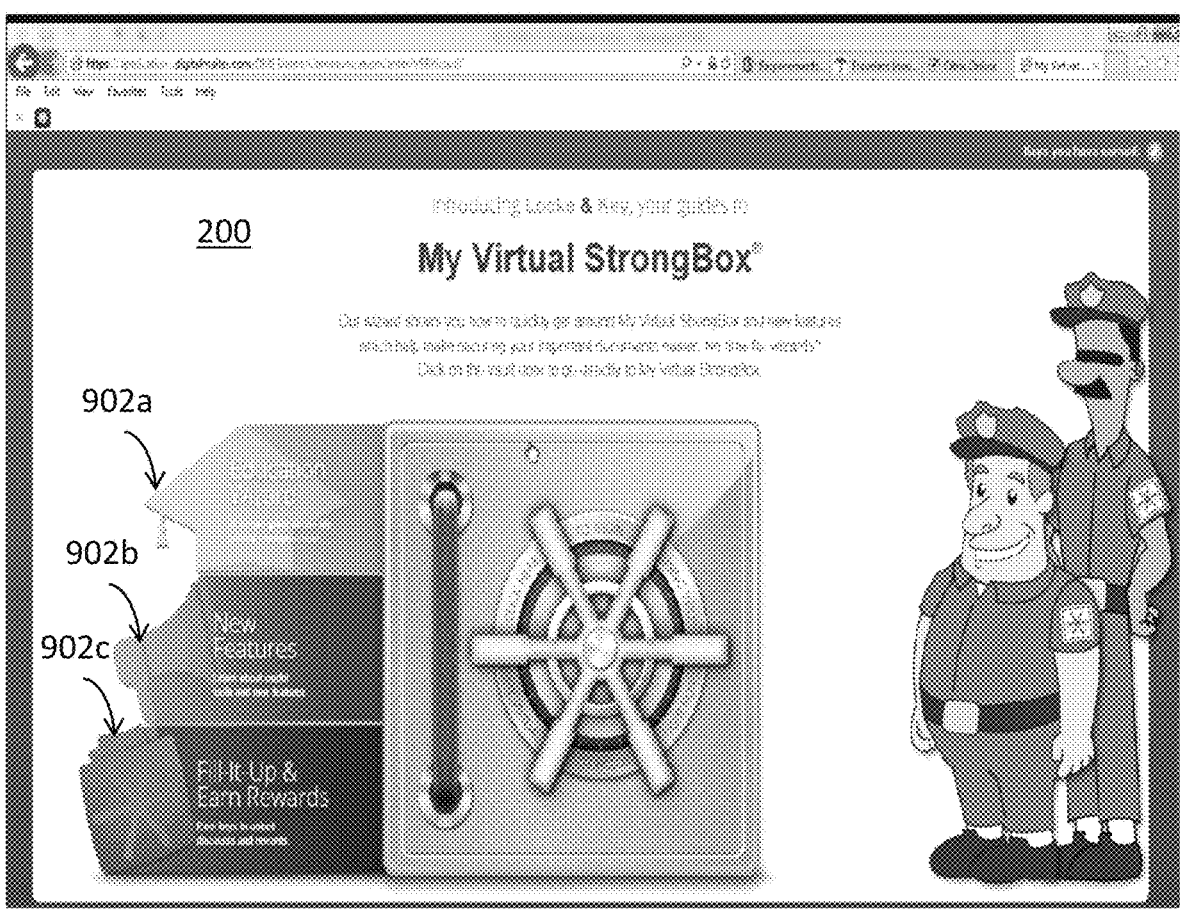
FIG. 9 is a screen shot of the educational guide and the reward system that can be implemented within one or more embodiments of the present invention.

The virtual storage system 100 further includes at least one processor 124 for receiving information including requests from the user at the banking system 70 and processing the requests, such as storing and retrieving electronic documents. The virtual storage system 100 further includes a system memory 125 and at least one storage server comprising a plurality of physical storage devices 126 for storing files such as electronic documents, audio files, photographs, movies, and images received from the user via the banking system 70. The system memory 125 may retrieve the electronic data and any instructions/rules from the storage devices 126 and loads the electronic data and instructions/rules into the processor 124 for processing. According to one or more embodiments, an educational guide module 200 (as depicted in FIG. 9) may be included within the storage device 126. The educational guide module 200 may be a software module, for example, which is retrieved by the system memory 125 and loaded into the processor 124 for processing and operation thereof.

According to an embodiment of the present invention, the files can be stored in any format, for example, Hyper Text Markup Language (HTML), portable document format (PDF) or any other suitable format. The virtual storage system 100 acts as a safe deposit box for receiving and securely storing the files received from the user via the banking system 70. Although only one processor 124 and two storage devices 126 are shown, the present invention is not limited hereto, and may vary accordingly.

As shown in FIG. 1, the virtual storage system 100 includes a web interface (e.g., the web interface 122) however the present invention is not limited to this particular configuration, and may vary accordingly.

Figure 2:
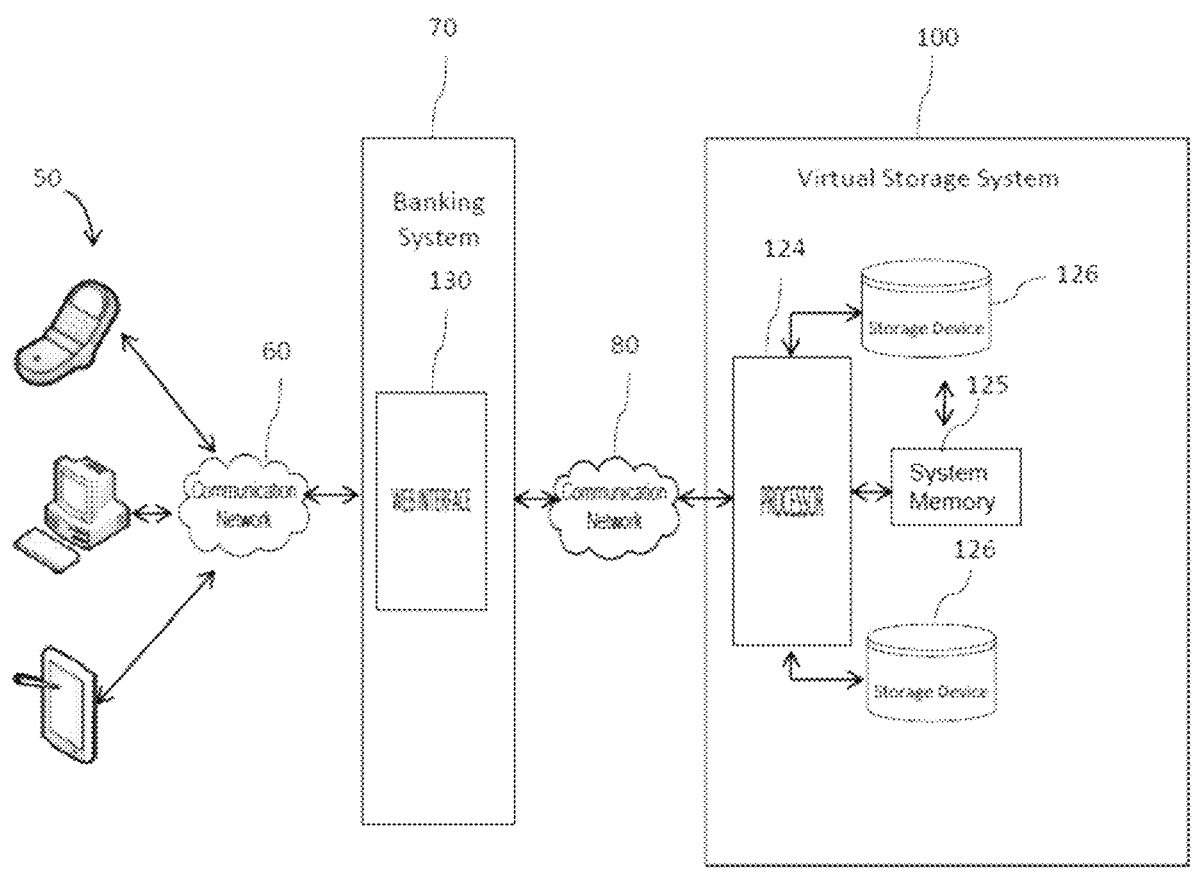
FIG. 2 is a block diagram of a virtual storage system that can be implemented within alternative embodiments of the present invention.
Figure 3:
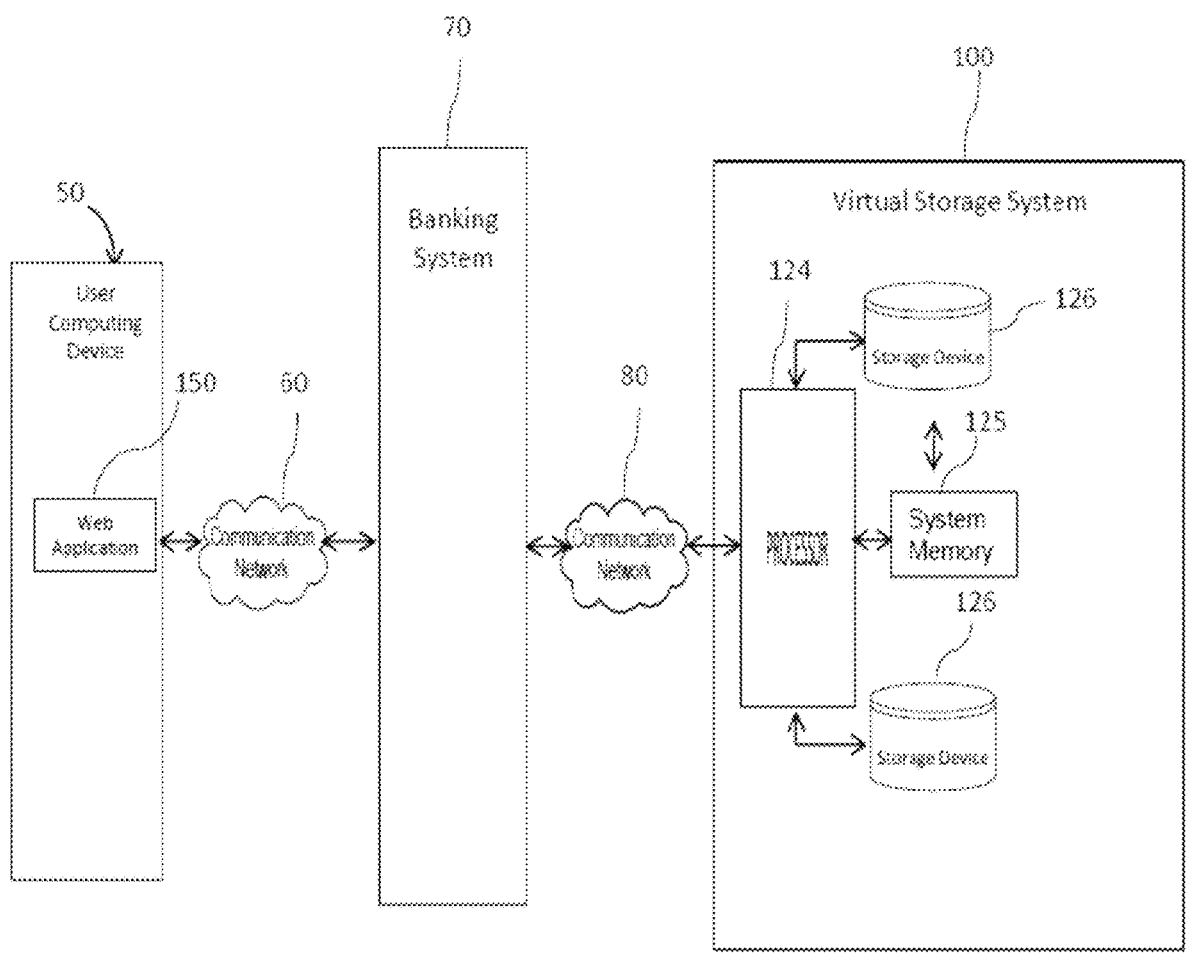
FIG. 3 is a block diagram of a virtual storage system that can be implemented within alternative embodiments of the present invention.
Figure 4:
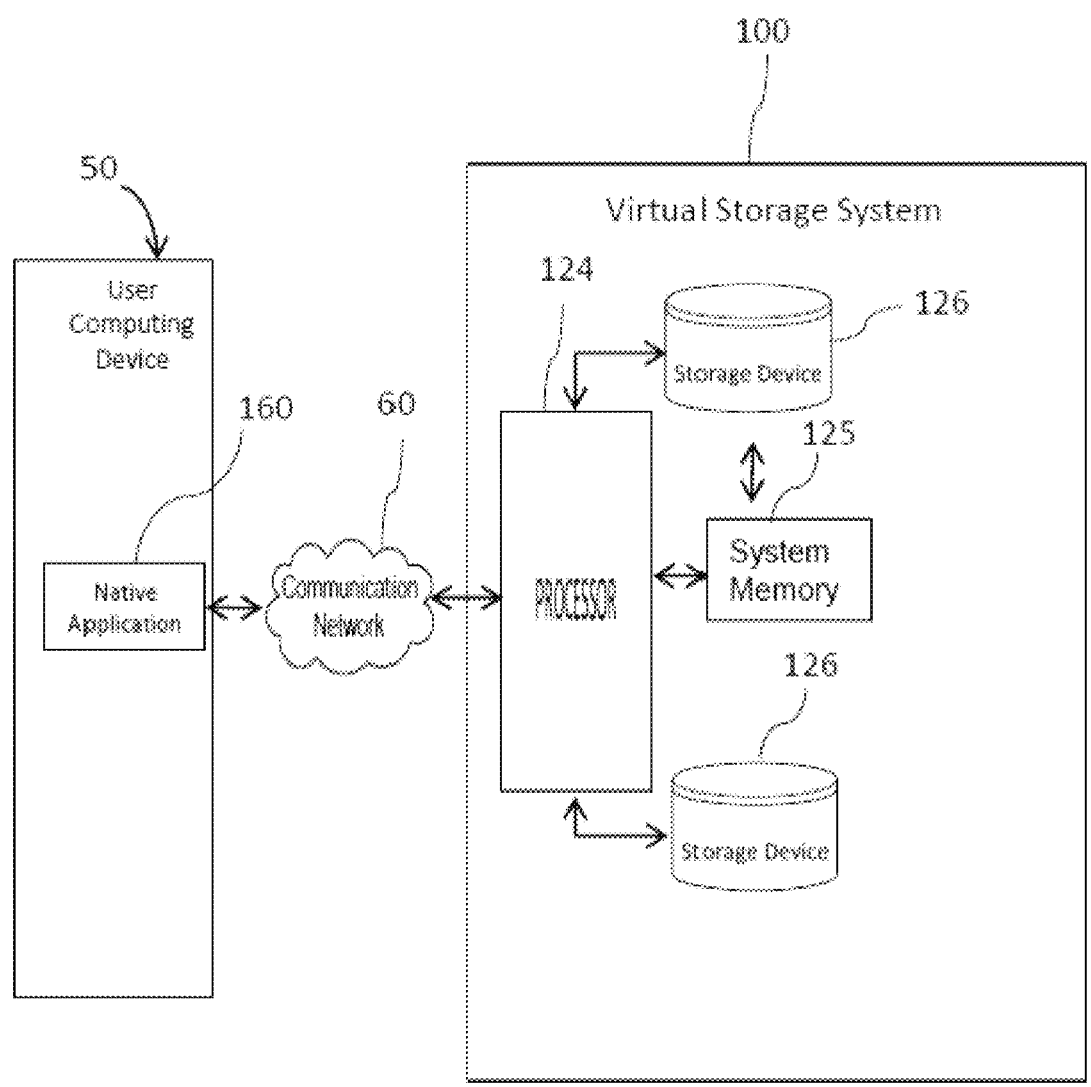
FIG. 4 is a block diagram of a virtual storage system that can be implemented within alternative embodiments of the present invention.

FIGS. 2 through 4 illustrate alternative configurations of the virtual storage system 100, and communication between the virtual storage system 100, the external system (e.g., the banking system 70), and/or the user computing device 50 according to other embodiments of the present invention that may be implemented. Some of the components shown in FIGS. 2 through 4 are the same as the components discussed above with reference to FIG. 1 therefore a detailed description of these components is omitted.

As shown in FIG. 2, in an alternative embodiment, the banking system 70 includes a web interface 130 configured to interface the banking system 70 with the virtual storage system 100 over the communication network 80. The web interface 130 functions in a similar manner as the web interface 122 of the virtual storage system 100 therefore in this embodiment, the web interface 122 of the virtual storage system 100 is omitted.

As shown in FIG. 3, in another alternative embodiment, the user computing device 50 includes a web application 150 (e.g., a web API) for connecting to the banking system 70 and the virtual storage system 100 indirectly through the banking system 70. The web application 150 is an internet-enabled application, for example, that has specific functionality for the user computing device 50 (e.g., a mobile phone). The web application 150 is accessed through a web browser of the user computing device 50 and does not require downloading and installing thereof onto the user computing device 50.

As shown in FIG. 4, in yet another alternative embodiment, the user computing device 50 includes a native application 160 for connecting directly to web services (i.e., the processor 124) of the virtual storage system 100. The native application 160 is directly installed on the user computing device 50 to allow the user to gain direct access to the virtual storage system 100. The native application 160 is a specifically-designed API for accessing the virtual storage system 100. For example, if the user computing device 50 is a tablet, the tablet may include a tablet API for directly accessing the web services of the virtual storage system 100. Therefore, in this embodiment, the web interface 130 of the banking system 70 as shown in the embodiment illustrated in FIG. 2; and the web interface 122 of the virtual storage system 100 as shown in FIG. 3 are omitted.

According to one or more embodiments, the native application 160 may include a multi-factor authentication process to be performed at many levels to enable a user to gain direct access to the virtual storage system 100 from the user computing device 50. The multi-factor authentication process may include steps such as sending login information (e.g., user ID and password information) in a correspondence (e.g., a text message or email) to the user, and providing a time-based one-time password system to the user via a third party.

According to another embodiment, a single-factor authentication process may be used to gain access to the virtual storage system 100 via the external system (e.g., the banking system 70) since the external system and the virtual storage system 100 communicate via a secure connection on the communication network 80.

When a user accesses the banking system 70 via a bank server, the user can be automatically directed to the virtual storage system 100 when desired.

As shown in FIGS. 1 through 4, the user computing device 50, banking system 70 and virtual storage system 100 can be connected with each other via the communication networks 60 and 80. According to one embodiment, the user computing device 50 may occasionally connect to the communication network 60 while the banking system 70 and the virtual storage system 100 may maintain a connection to the communication networks 60 and 80. Further, in FIG. 4, the user computing device 50 and the virtual storage system 100 are in direct communication with each other over the communication network 80.

According to alternative embodiments, the virtual storage system 100 can be included within the banking system 70 or the user computing device 50 as installable software.

Figure 5:
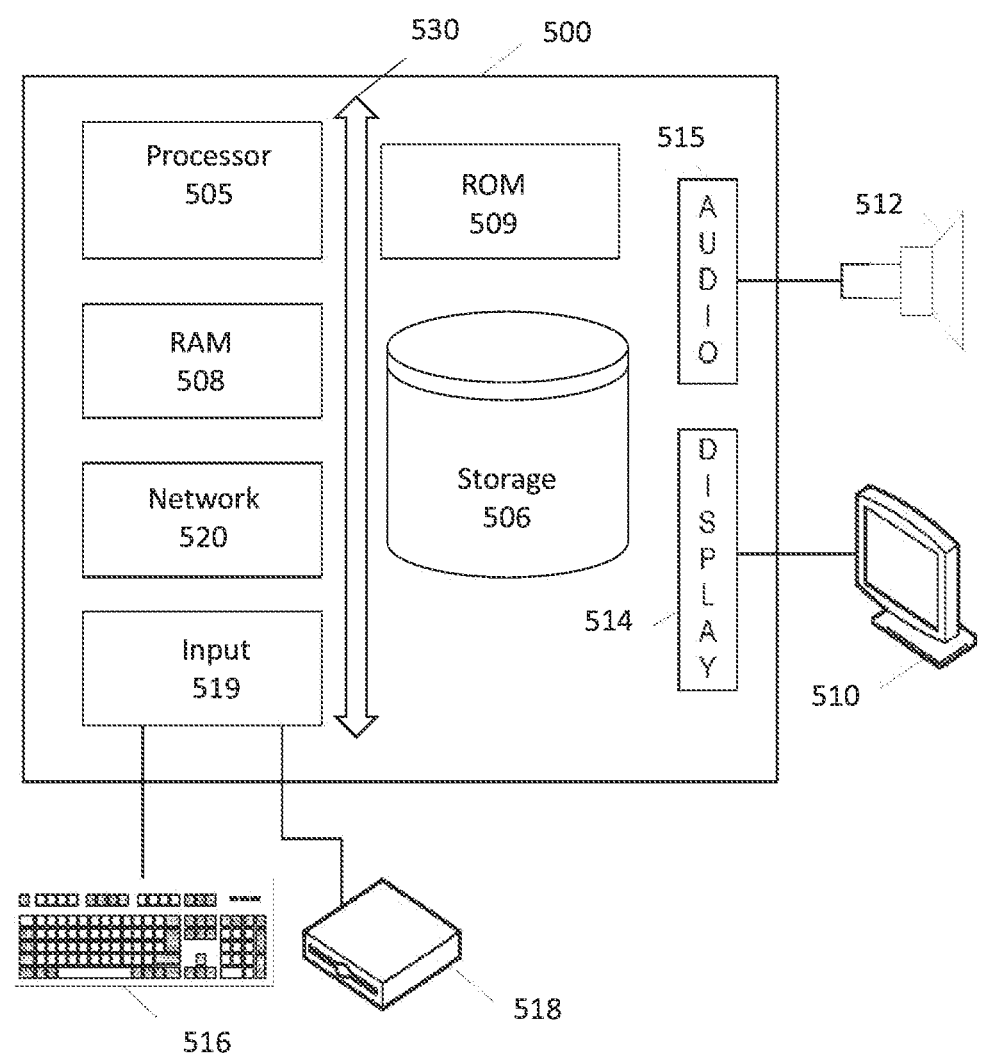
FIG. 5 is a block diagram of an exemplary computer to be implemented within one or more embodiments of the present invention.

FIG. 5 is a block diagram of an exemplary computing device 500 illustrating components of the computing device 50, the banking system 70 and the virtual storage system 100 shown in FIG. 1. As shown in FIG. 5, the computing device 500 includes various components for inputting, outputting, storing and processing data. The computing device 500 includes a processor 505 for performing tasks including executing one or more applications, retrieving data from a storage device e.g., storage 506, and/or outputting data. The processor 505 can be connected to a Random access memory (RAM) module 508 wherein application data and/or instructions may be temporarily stored. The computing device 500 can further includes a Read Only Memory (ROM) 509 configured to allow data stored thereon to persist after the computing device 500 is turned off and is used for storing an operating system (OS) of the computing device 500. The storage device 506 may also provide storage for data files and may include computer readable mediums e.g., disk drives, optical storage mediums e.g., CD ROM drives, magnetic tape storage systems, and flash memory. The processor 505 is configured to retrieve an application from the storage 506 and store the instructions associated with the application in the RAM module 508, while the processor 505 is executing the application. The computing device 500 further includes output devices e.g., a display device 510, and a speaker 512, for outputting visual and audio data via a display adapter 514 and an audio adapter 515. Further, the computing device 500 includes input devices e.g., a keyboard 516, a storage media drive 518, and microphone each having an associated adapter 519 for converting the input data into computer readable data. The storage media drive 518 enables users to read and write data to and from the storage media.

Further, as shown in FIGS. 1 through 4, the user computing device 50 includes one or more components for receiving and transmitting data over the communication networks 60 and 80. For example, a network adapter 520 is provided for communication with one or more computing devices over an IP network, for example, for transmission of data such as financial data over the banking system 70. The network adapter 520 may include instructions associated with processing IP network packets and cellular network packets. The components of the computing device 500 are connected via a system bus 530.

Figure 6:
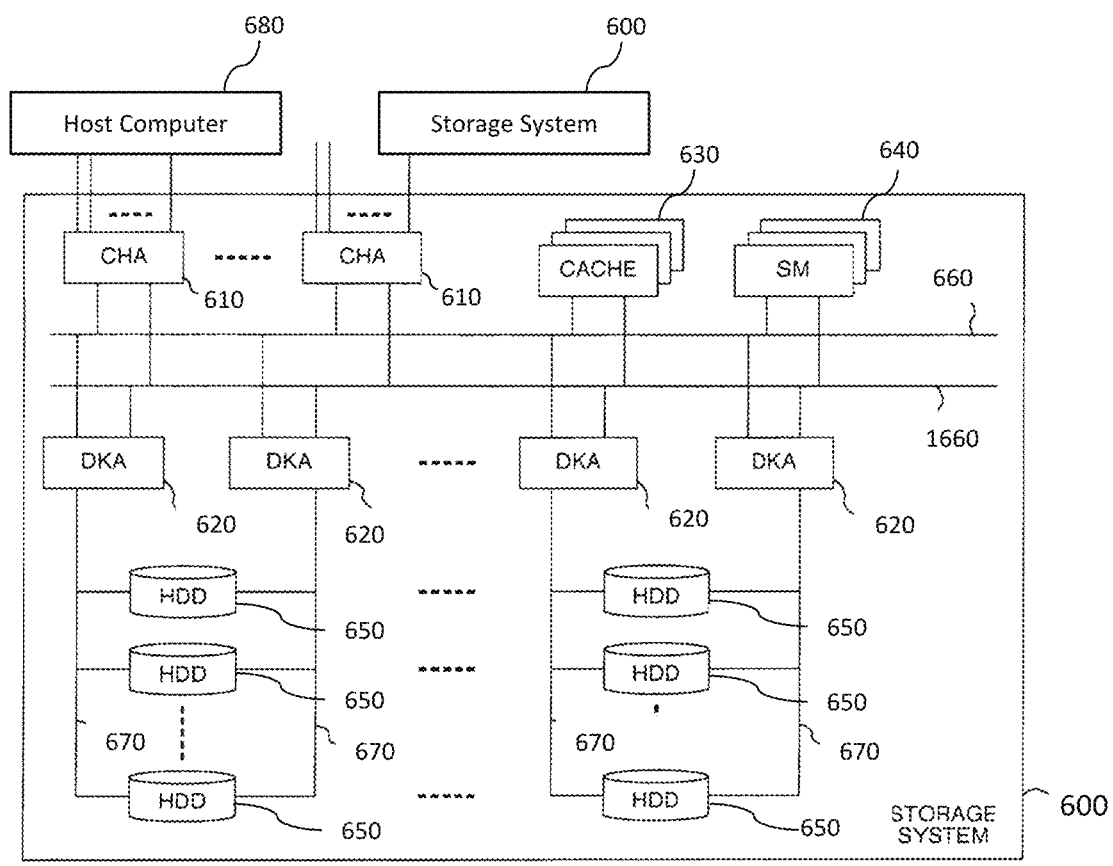
FIG. 6 is a block diagram of an exemplary physical storage system for implementation of the virtual storage system in accordance with one or more embodiments of the present invention.

It should be noted that the virtual storage system 100 as shown in FIGS. 1 through 4 is implemented on a physical storage system 600 such as that illustrated in FIG. 6.

As shown in FIG. 6, the physical storage system 600 includes a plurality of host adapters (CHA) 1610, disk adapters (DKA) 620, cache memories (CACHE) 630, shared memories (SM) 640, and hard disk drives (HDD) 650 connected with each other via common paths 660 and connection lines 670. Each of the hard disk drives (HDD) 650 is connected to two disk adapters 620, for example, using different connection lines 670. The host adapters 610 control data transfer between host computers 680, the cache memories 630 and the hard disk drives 1650. The cache memories 630 temporarily store data received from the host computer 680 and data read from the hard disk drives 650. The shared memories 640 are shared between the host adapters 610 and the disk adapters 620. The present invention is not limited to any particular number of host adapters 610, disk adapters 620, cache memories 630, shared memories 640 and hard disk drives 650, and may vary accordingly. The physical storage system 600 is one example of a physical storage system for which the virtual storage system can be implemented thereon. The present invention is not limited to a particular configuration of the physical storage system. According to other embodiments, the hard disk drives (HDD) 650 can be replaced with a flash storage, RAM disks or rotated disk drives, for example. The host computers 680 can be the processor 124 or a separate computer, for example. Further, the virtual storage system 100 can be implemented on any type of storage system such as a network-attached storage (NAS), a storage area network (SAN), or a distributed memory array.

Further, according to one or more embodiments, the physical storage devices of the physical storage system 600 as described above can be configured in a RAID (Redundant Array of Independent Disks) configuration. Further, the reliability of the data stored in the storage devices 126 of the virtual storage system 100 can be stored in a redundant manner in redundant data centers using mirroring, remote copy, or the like. The use of redundant storage devices enables the data stored to be duplicated thereby preventing data loss.

Figure 7:
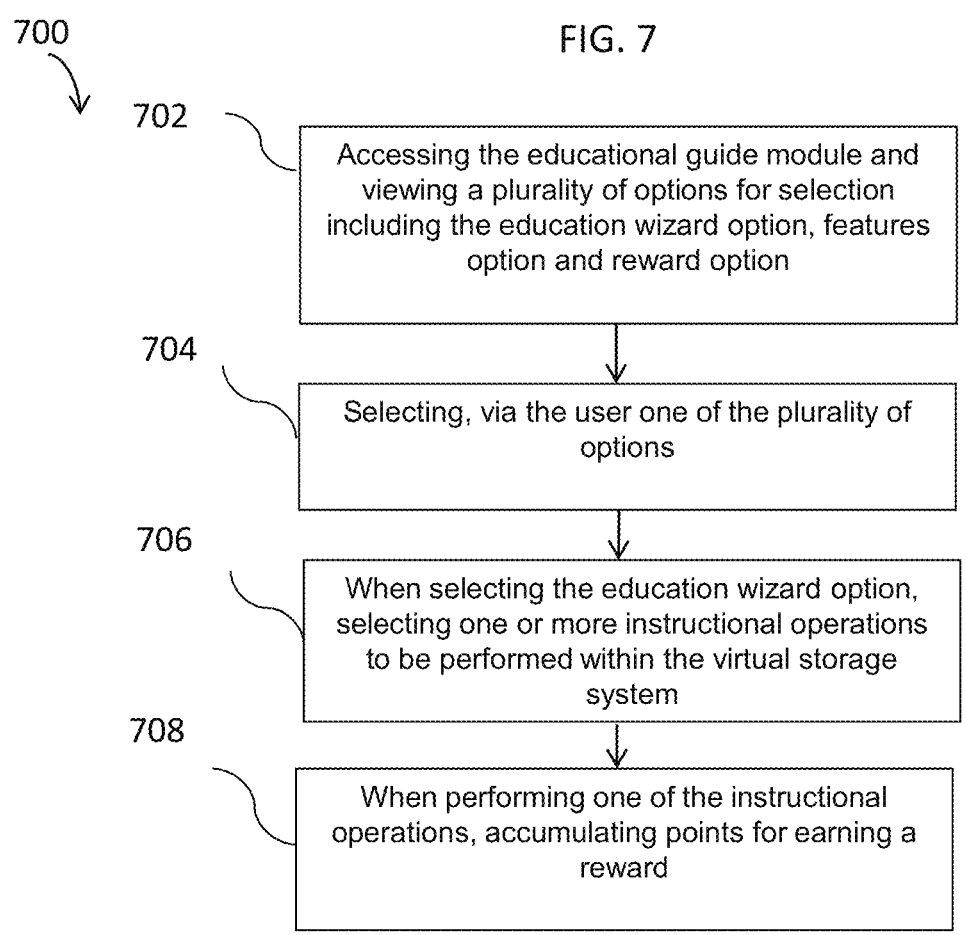
FIG. 7 is a flowchart illustrating a method for an educational guide for the virtual storage system, for managing electronic documents within the virtual storage system according to one or more embodiments of the present invention.

FIG. 7 is a flowchart illustrating a method 700 for operating the educational guide module 200 for the virtual storage system 100, for managing electronic documents within the virtual storage system 100, for example, according to one or more embodiments of the present invention. The method 700 is implemented in software modules for execution by the user computing device 50, the banking system 70 and the virtual storage system 100.

In method 700, the user is presented with a login window for performing a login operation to access educational guide module for the virtual storage system 100. The user inputs access information (e.g., login information including email and password) as requested to gain access. At operation 702, upon accessing the educational guide module, the user is presented via the user computing device 50, with a plurality of options (e.g., education wizard option 902a, features option 902b and reward system option 902c) for selection (see FIG. 9, for example). At operation 704, the user selects one of the plurality of options, e.g., the education wizard option 902a for performing one or more instructional operations regarding the virtual storage system 100.

According to one or more embodiments, an instructional operation is a set of instructions for performing an operation of the virtual storage system 100. Some examples of the instructional operations include creating or deleting a folder, and uploading or renaming an electronic document.

From operation 704, the process continues to operation 706 where the user selects one or more instructional operations to be performed.

From operation 706, the process continues to operation 708, where upon performing each instructional operation, the user accumulates points or keys, for example, for earning a reward (as discussed below). According to embodiments of the present invention, the user can access the virtual storage system 100 at any time while performing the educational wizard guide, directly or indirectly via the banking system 70 (as shown in FIGS. 1 through 4).

The present invention is described herein in terms of block components, screen shots, and optional selections and processing steps. It should be appreciated that the functional blocks may be realized by any number of hardware and/or software components configured to perform the specified functions. For example, the present invention may employ various integrated circuits e.g., memory elements, processing elements, logic elements, look-up tables, and others which may perform the functions under the control of one or more processors or other control devices. The software components can be implemented with any programming or scripting language, with various algorithms implemented with data structures, objects, processes, and other programming elements.

An exemplary process of the method 700 of FIG. 7 will be described with reference to the screen shots shown in FIGS. 9 through 19. Screen shots 900 and 1900 shown in FIGS. 9 through 19, respectively, are implemented for example, via a web page for network transmission. The web page may include standard HTML documents, and various forms JAVA® applets, active server pages (ASP), common gateway interface scripts (CGI), extensive markup language (SML), dynamic HTML, plugins, etc.

As shown in FIG. 9, the screen shot 900 for a user to access an instructional guide system 200 for the virtual storage system 100 is provided. As shown, a plurality of option tabs 902a, 902b and 902c is displayed to the user upon accessing the educational guide module 200 of the virtual storage system 100. The option tab 902a accesses an education wizard guide for illustrating a plurality of instructional operations that can be performed within the virtual storage system 100. The option tab 902b accesses and provides information regarding a plurality of new features of the virtual storage system 100 to be performed. Further, the option tab 902c accesses a reward system that can be implemented within one or more embodiments of the present invention. The user selects at least one of option tab 902a, 902b or 902c to be accessed. When the user selects option tab 902a, a plurality of instructional guide operations for selection are displayed to the user (e.g., instructional guide operation 1002) as shown in screenshot 1000 of FIG. 10.

Figure 10:
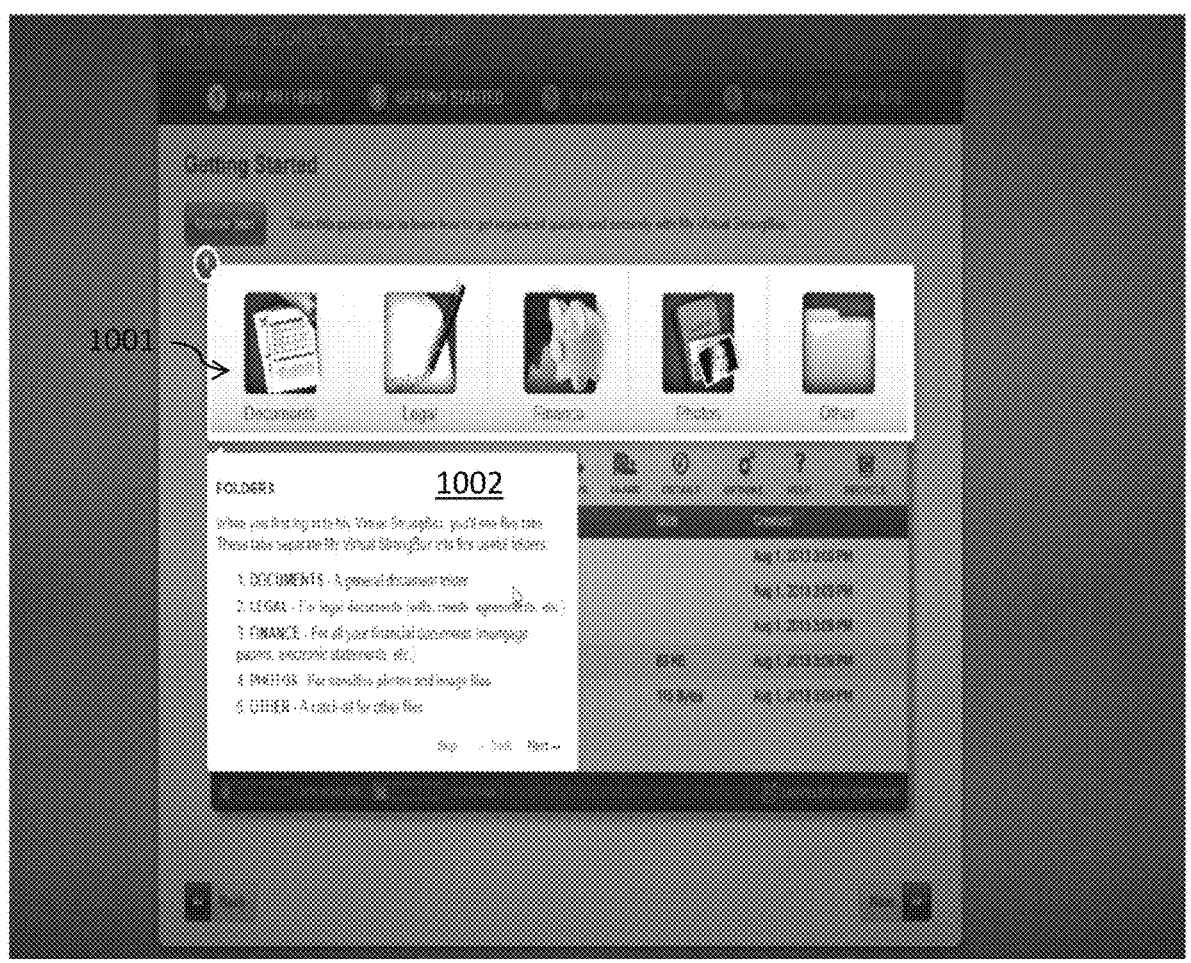
FIG. 10 is a screen shot of an instructional guide operation (i.e., existing folders guide operation) of the method shown in FIG. 7 that can be implemented within one or more embodiments of the present invention.

In FIG. 10, screen shot 1000 illustrates a plurality of electronic folders 1001 of the virtual storage system 100 for storing electronic documents of the user. The instructional operation 1002 displayed to the user provides a description of the electronic folders 1001 (e.g., name of each electronic folder) and the type of electronic documents to be stored in each of the plurality of electronic folders 1001.

Figure 11:
FIG. 11 is a screen shot of an instructional guide operation (i.e. create a folder guide operation) of the method shown in FIG. 7 that can be implemented within one or more embodiments of the present invention.

Then, as shown in FIG. 11, a screen shot 1100 includes an add file option 1101 and an associated instructional guide operation 1102 for uploading an electronic document (e.g., a user's first file) to the virtual storage system 100. The instructional operation 1102 guides the user through the entire uploading process including selection of the folder where the user desires to store the electronic document, selection of the electronic document and uploading the same.

Figure 12:
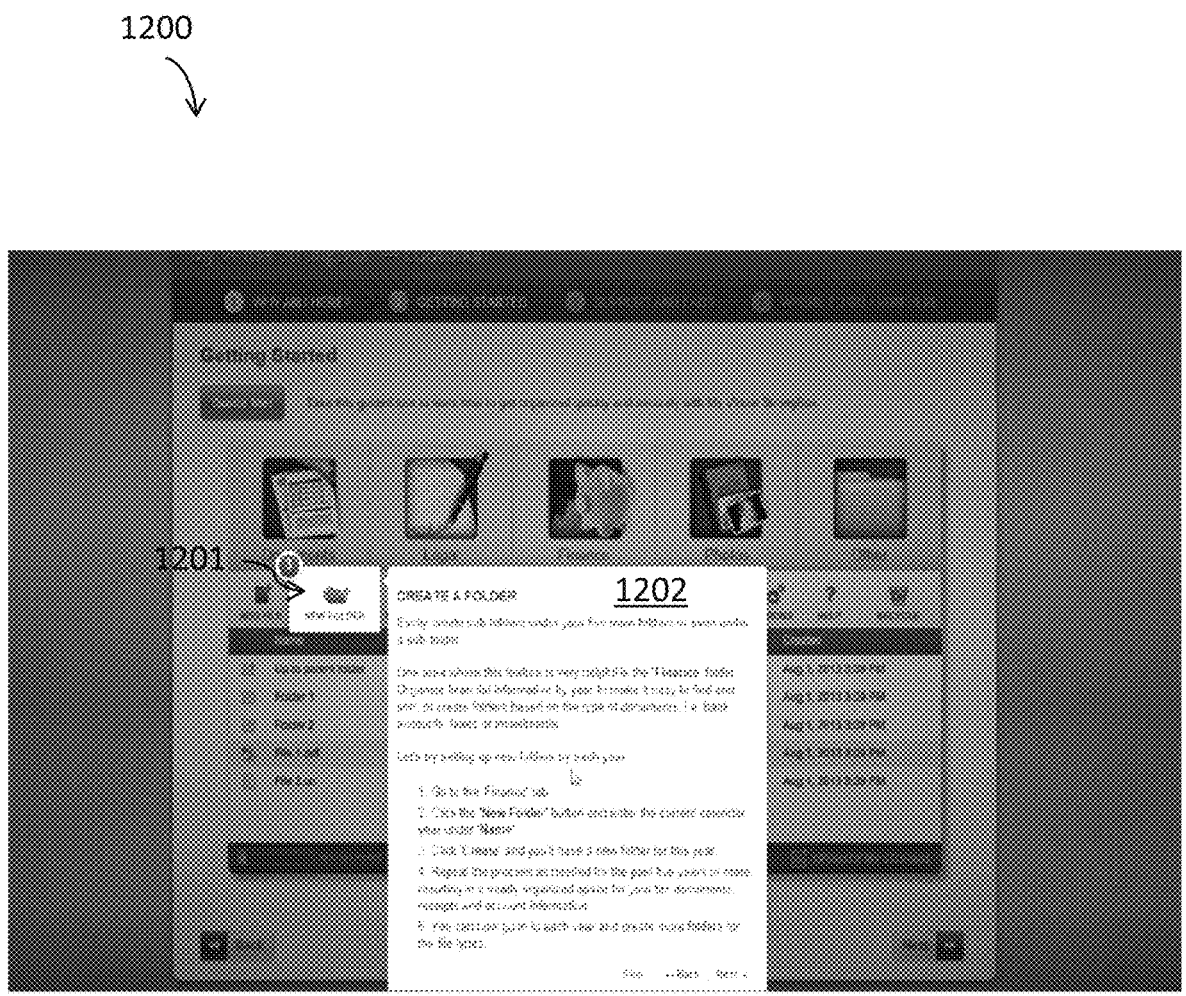
FIG. 12 is a screen shot of another instructional guide operation (i.e., upload a file operation) of the method shown in FIG. 7 that can be implemented within one or more embodiments of the present invention.

Next, as shown in FIG. 12, a screenshot 1200 includes a new folder option 1201 and an associated instructional guide operation 1202 for creating a folder and guides the user through the entire folder creating process (as shown in steps 1 through 5 of the instructional guide operation 1202). According to one embodiment, steps 1 through 5 include the following (1) selecting a specific folder (e.g., the finance folder); (2) selecting new folder button, and entering the current calendar year under "Name" for creating new folders by year; (3) Clicking create to create the new folder for the calendar year; (4) repeating the process as needed for any past years; and (5) created new folders for different file types under each year as needed.

Figure 13:
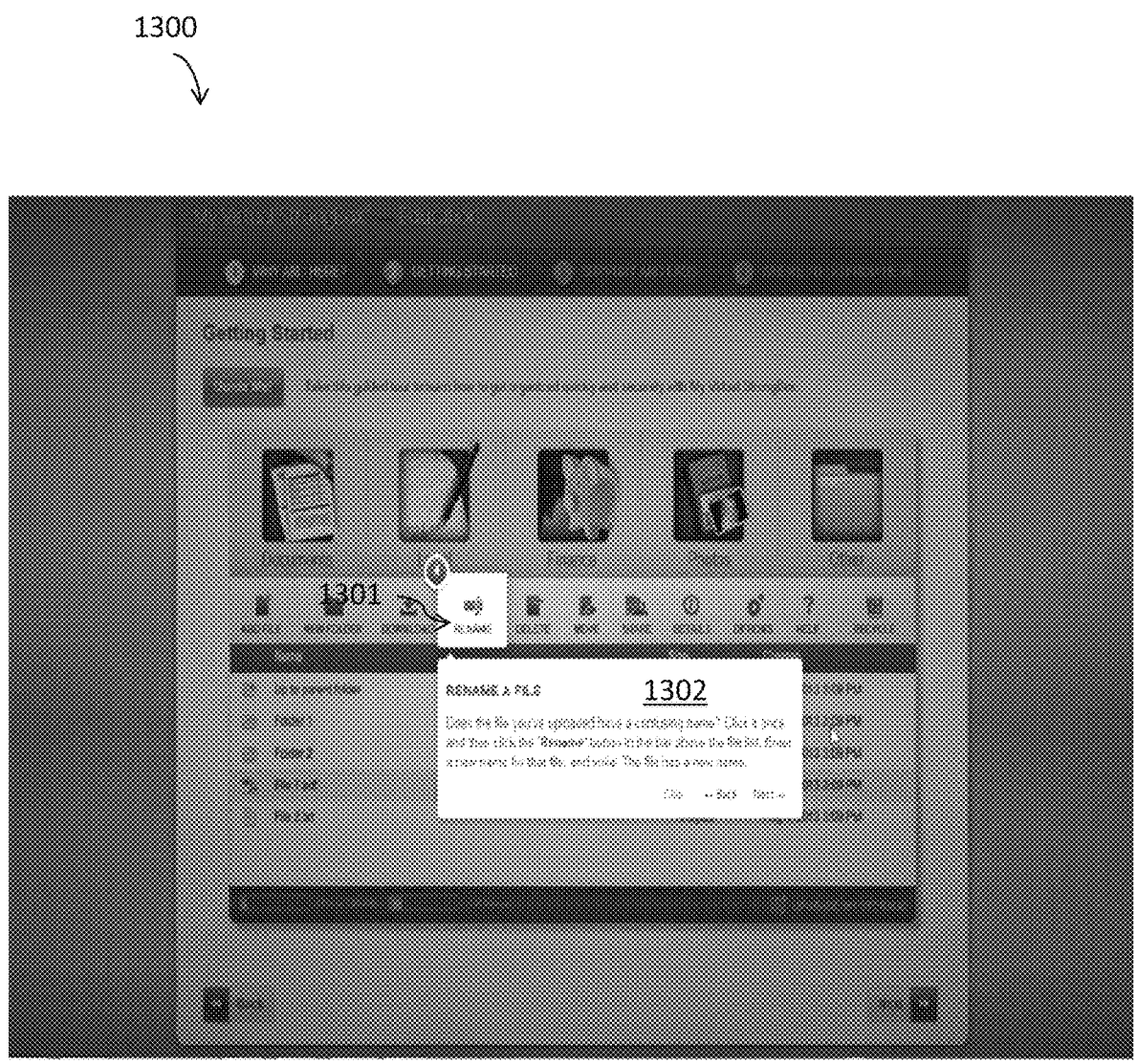
FIG. 13 is a screen shot of another instructional guide operation (i.e., rename a file guide operation) of the method shown in FIG. 7 that can be implemented within one or more embodiments of the present invention.

Next, as shown in FIG. 13, a screen shot 1300 includes a rename file option 1301 and an associated instructional guide operation 1302 for renaming a file which has been previously uploaded and stored in the virtual storage system 100.

Figure 14:
FIG. 14 is a screen shot of another instructional guide operation (i.e., delete a file guide operation) of the method shown in FIG. 7 that can be implemented within one or more embodiments of the present invention.
Figure 19:
FIG. 19 is a screen shot of another instructional guide operation (i.e., restore a file guide operation) of the method shown in FIG. 7 that can be implemented within one or more embodiments of the present invention.

Further, as shown in FIG. 14, a screen shot 1400 includes a delete file option 1401 and an associated instructional guide operation 1402 for deleting a file which has been previously uploaded and stored in the virtual storage system 100. As shown, the instructional operation 1402 instructs a user on how to delete the file by moving the file to a recycle bin; and instructional guide operation 1902 (as depicted in FIG. 19) instructs a user on how to restore a file which has been deleted by mistake.

Figure 15:
FIG. 15 is a screen shot of another instructional guide operation (i.e., move a file guide operation) of the method shown in FIG. 7 that can be implemented within one or more embodiments of the present invention.

In FIG. 15, a screen shot 1500 is provided and includes a move file option 1501 and an associated instructional guide operation 1502 for moving an electronic document to another existing folder.

Figure 16:
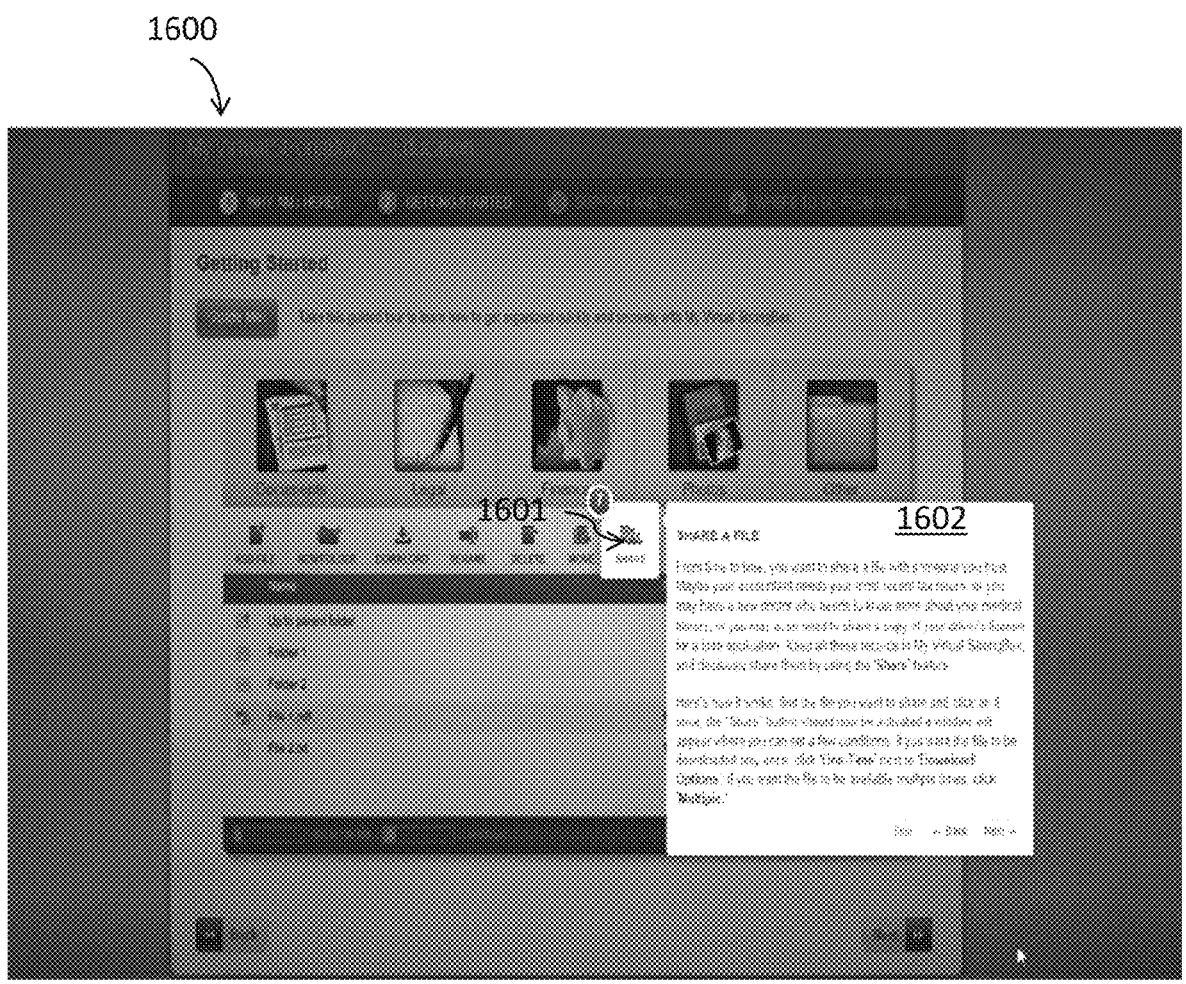
FIG. 16 is a screen shot of another instructional guide operation (i.e., share a file guide operation) of the method shown in FIG. 7 that can implemented within one or more embodiments of the present invention.
Figure 17:
FIG. 17 is a screen shot of another instructional guide operation (i.e., expire a share link guide operation) of the method shown in FIG. 7 that can be implemented within one or more embodiments of the present invention.

Further, as shown in FIGS. 16 and 17, screen shots 1600 and 1700 include a share file option 1601 and associated instructional guide operations 1602 and 1702 for sharing a file (e.g., an electronic document) with a third party. The instructional guide operation 1602 includes steps for creating a share link as described in application Ser. No. 13/752,008 entitled "Virtual Storage System and Method of Sharing Electronic Documents within the Virtual Storage System" by Ronald M. Daly, Jr. et al. filed on Jan. 28, 2013, the disclosure of which is incorporated by reference in its entirety. The instructional guide operation 1702 includes further steps for creating a share link including setting an expiration period and sharing the link by copying the share link and sending it via email, for example, to a recipient. Further, the instructional guide operation 1702 includes a step for deleting a previously created share link sent to the recipient.

Figure 18:
FIG. 18 is a screen shot of another instructional guide operation (i.e., create upload link guide operation) of the method shown in FIG. 7 that can be implemented in one or more embodiments of the present invention.

As shown in FIG. 18, a screen shot 1800 is provided and includes an instructional guide operation 1802 for allowing a third-party to add (i.e., upload) an electronic document to a user's virtual storage system 100. The instructional operation 1802 includes steps for selecting an electronic folder, creating a share link including an optional upload code and emailing the share link to a recipient and providing the recipient with the upload code, for uploading an electronic document into the virtual storage system 100. The steps of instructional guide operation 1802 are similar to those described in application Ser. No. 13/948,194 entitled "Virtual Storage System and Method of Sharing Access to the Virtual Storage System for Adding Electronic Documents" by Ronald M. Daly, Jr. et al. filed on Jul. 23, 2013, the disclosure of which is incorporated by reference in its entirety.

As shown in FIG. 19, a screen shot 1900 is provided and includes a recycle option 1901 and the associated instructional guide operation 1902 for retrieving electronic documents stored within the recycle bin by selecting a restore option The instructional guide operation 1902 also includes instructions for permanently deleting electronic documents which are stored in the recycle bin, from the virtual storage system 100.

According to one or more embodiments, the completion of the education wizard guide entitles the user to earn points and/or keys for redeeming a reward via the reward system discussed below with reference to FIGS. 8, 26 and 27.

Figure 8:
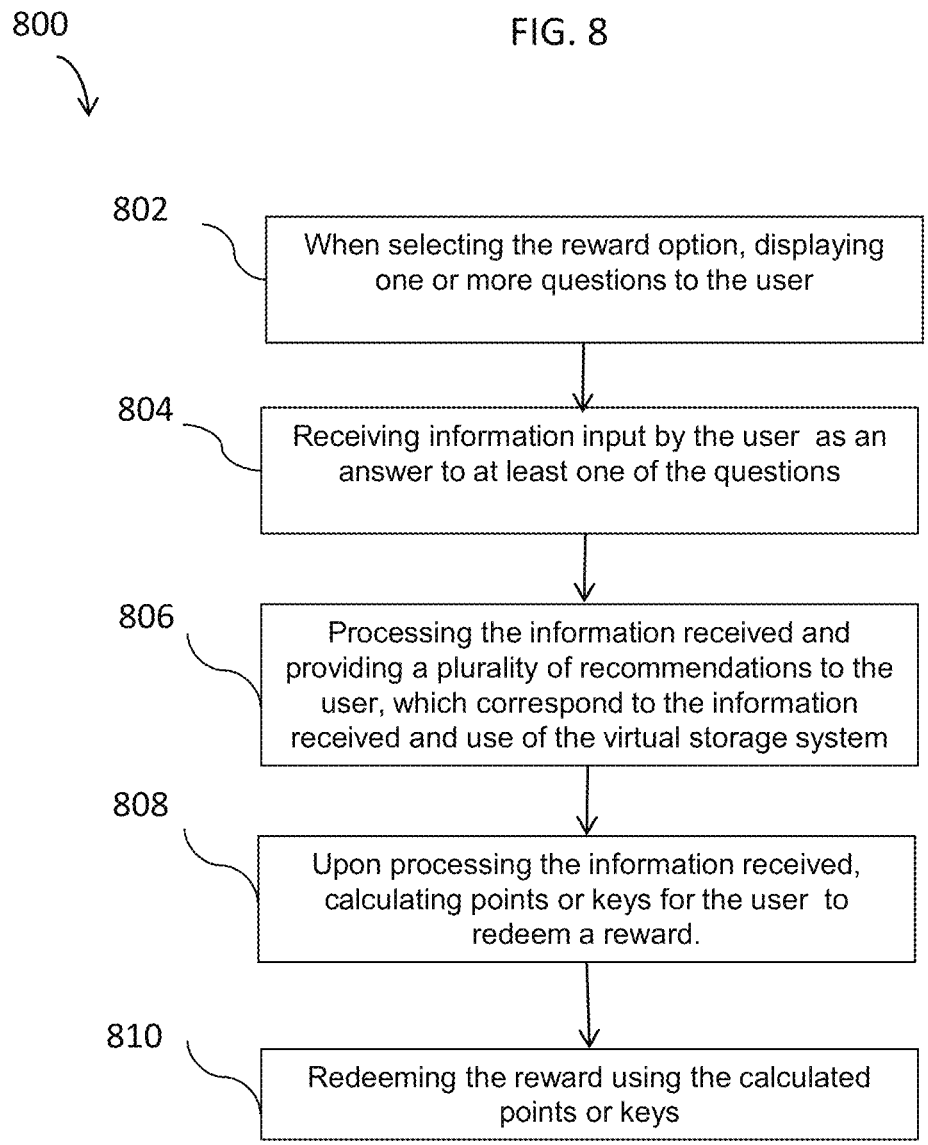
FIG. 8 is a flowchart illustrating a method for a reward system for the virtual storage system according to one or more embodiments of the present invention.

Referring now to FIG. 8, a flowchart illustrating a reward method 800 for the virtual storage system 100 is provided. The reward method 800 is performed upon selection of the reward option 902c of the educational guide module 200 according to one or more embodiments of the present invention.

The method 800 is implemented in software modules for execution by the user computing device 50, the banking system 70 and the virtual storage system 100.

In operation 802, when selecting the reward option 902c, one or more questions (as depicted in FIGS. 20 through 27) are displayed to the user, via the user computing device 50, the banking system 70 or within the virtual storage system 100. According to one or more embodiments, the questions are applicable to the user-specific information including, for example, family status, housing status, and business status, etc.

From operation 802 the process continues to operation 804 where the reward system receives information input by the user as an answer to at least one of the questions.

From operation 804, the process continues to operation 806 where the information received from the user is processed via the processor 124 and a plurality of recommendations are retrieved from the storage device 126 via the system memory 125 and displayed to the user via the user computing device 50, banking system 70 or the virtual storage system 100. The plurality of recommendations correspond to the information received from the user, and use of the virtual storage system 100 (i.e., for performing operations within the virtual storage system 100). For example, if the user is asked whether or not he/she is married or single, and the user's answer indicates that he/she is married, the plurality of recommendations displayed to the user may include tasks comprising scan and save a copy of your marriage license or a copy of your family photos, for example.

From operation 806 the process continues to operation 808 where upon processing the information received, points or keys are calculated for the user to redeem a reward.

From operation 808 the process continues to operation 810, where the user redeems a reward based on the number of points or keys accumulated.

According to one or more embodiments, the reward may include a purchase of additional storage space within the virtual storage system 100 using the points or keys accumulated.

An exemplary process of the method 800 of FIG. 8 will be described with reference to the screen shots shown in FIGS. 20 through 27. Screen shots 2000 and 2700 shown in FIGS. 20 through 27, respectively, are implemented for example, via a web page for network transmission. The web page may include standard HTML documents, and various forms JAVA® applets, active server pages (ASP), common gateway interface scripts (CGI), extensive markup language (SML), dynamic HTML, plugins, etc.

Figure 20:
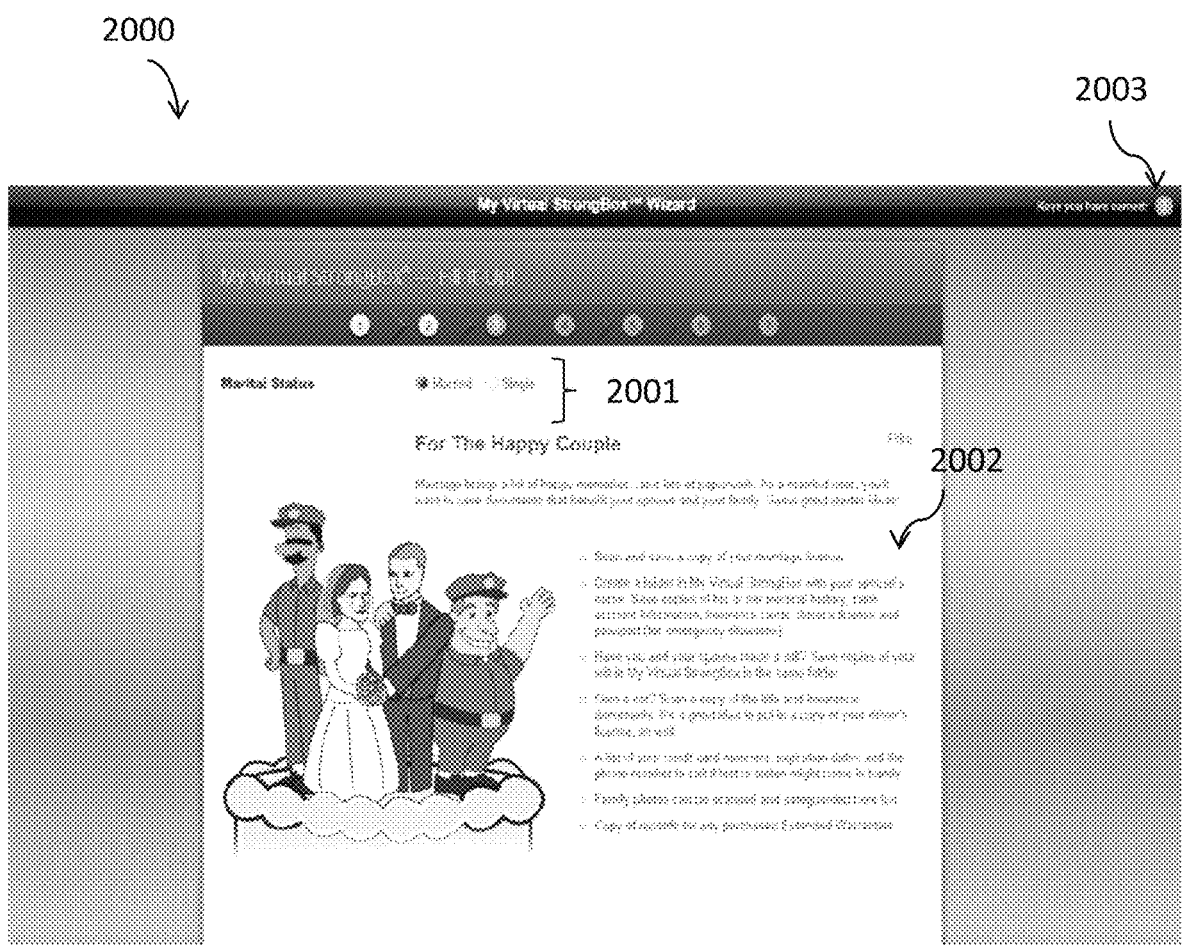
FIGS. 20 and 21 are screen shots of examples of a task operation regarding a user's marital status within the reward system of the method of FIG. 8 that can be implemented within one or more embodiments of the present invention.
Figure 21:
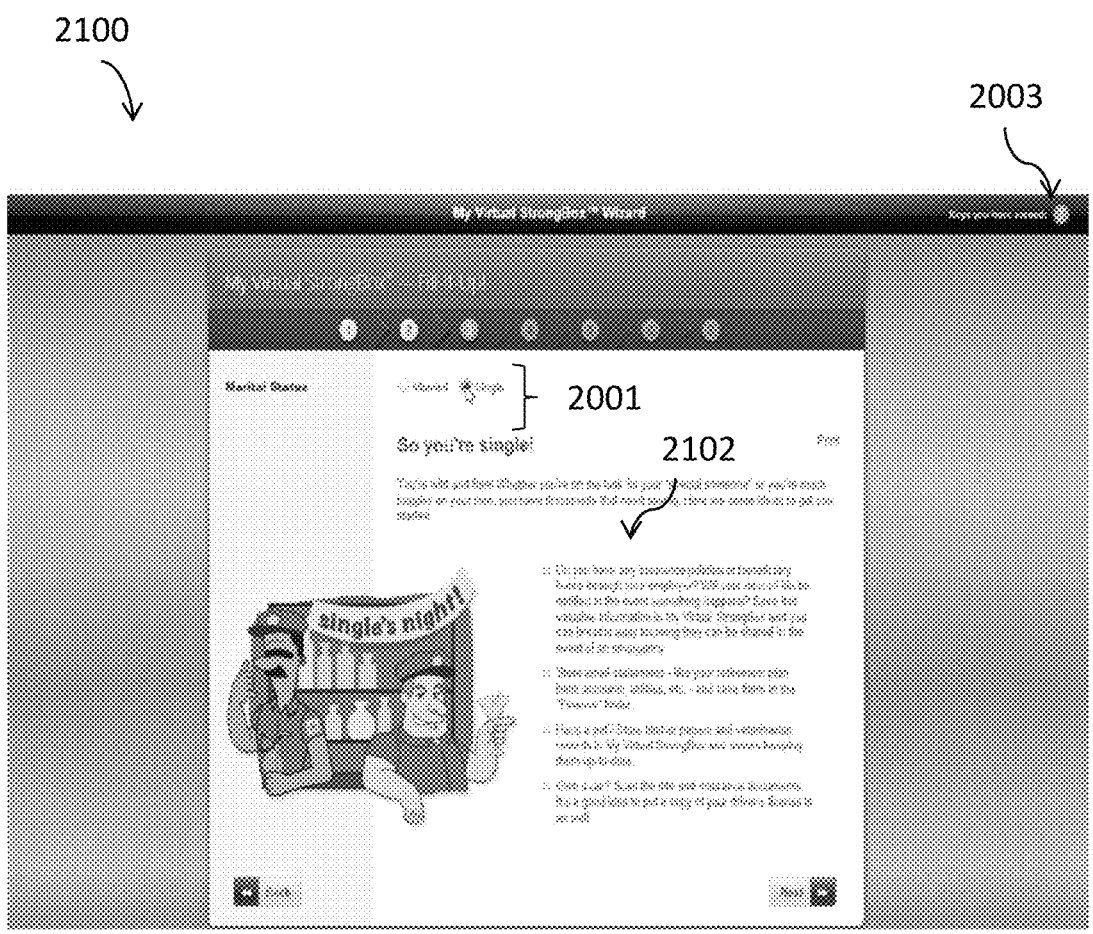

As shown in FIG. 20, in the screen shot 2000, a question 2001 concerning the user's marital status, for example. If the user is married, the user will be displayed a plurality of recommendations 2002 for tasks to be performed within the virtual storage system 100. For example, the tasks may include scan and save a copy of your marriage license, create folder in the virtual storage system 100 with the spouse's name and save copies of electronic documents pertaining to the spouse. For example, the electronic documents may include medical history, bank account information, insurance cards, driver's license and passport information, for example. Based on the answering of question 2001, the user accumulates points or keys as shown by icon 2003. For example, according to one or more embodiments, for each question answered the user earns at least one point As shown in FIG. 21, in the screen shot 2100, if the user is single, the user will be displayed a plurality of recommendations 2102 that include for example, the user's insurance policy information, banking information, pet information, and vehicle information.

Figure 22:
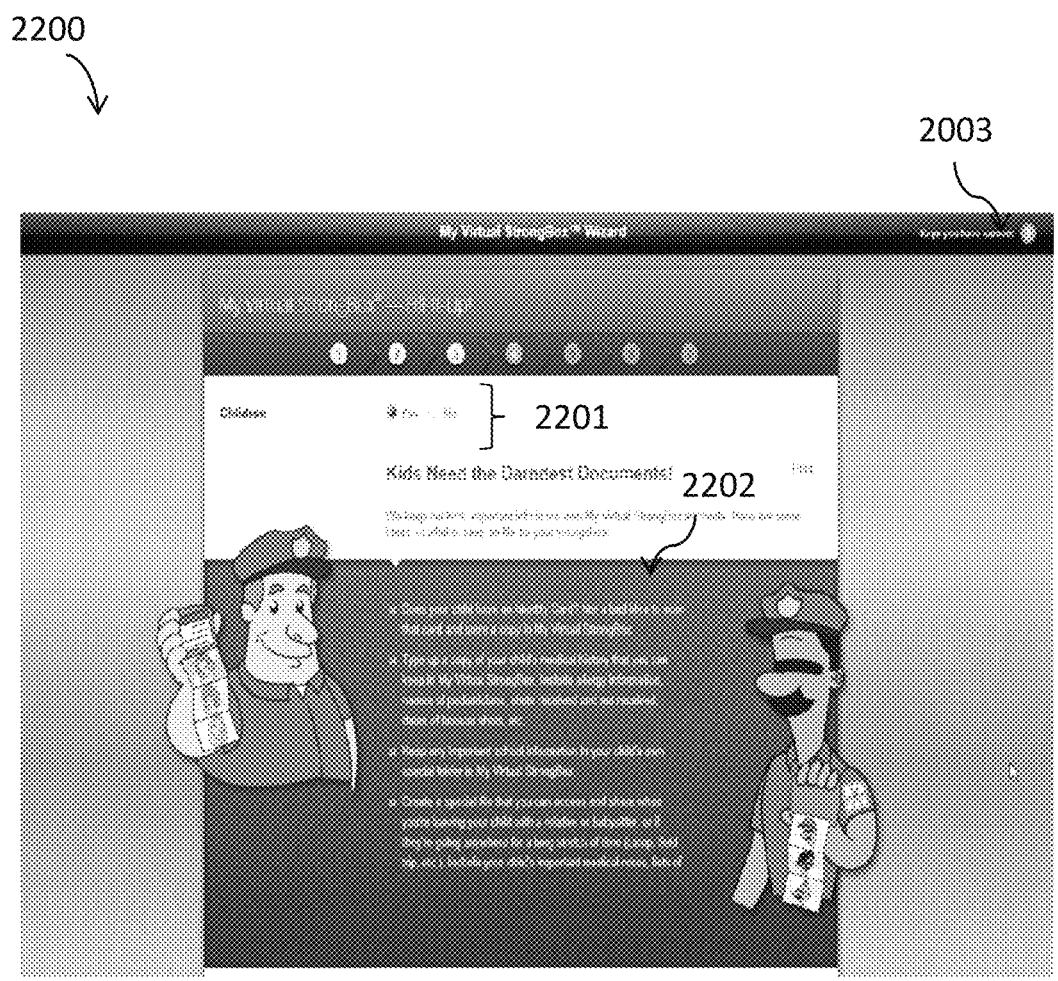
FIG. 22 is a screen shot of another example of a task operation regarding a user's family status that can be implemented within one or more embodiments of the present invention.

As shown in FIG. 22, in the screen shot 2200, a question 2201 regarding whether the user has children is displayed to the user. If the user has children, a plurality of recommendations 2202 pertaining to the user's children is displayed. The recommendations 2202 include, for example, child-specific information including identification cards, medical history information, and school information.

Figure 23:
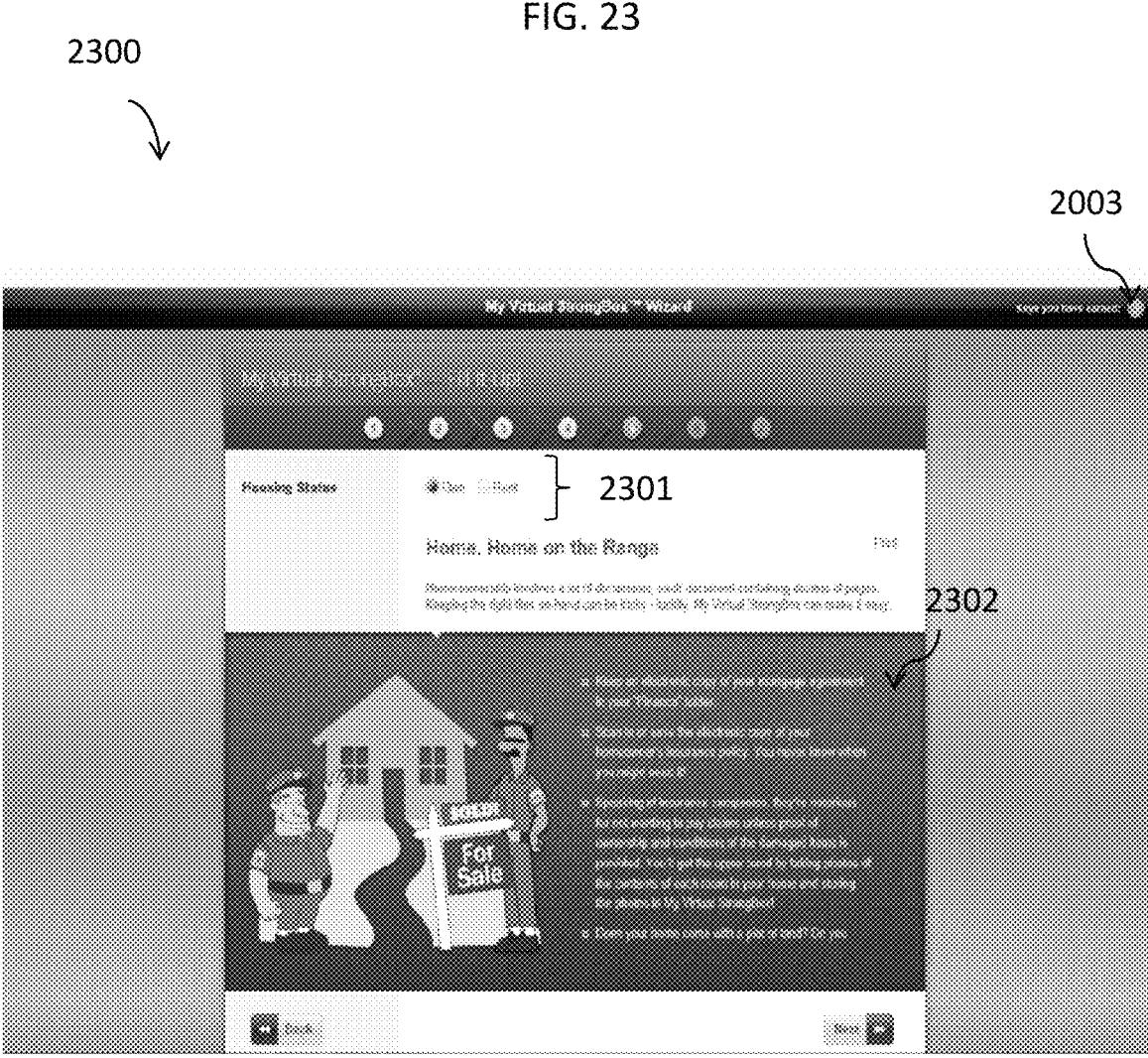
FIGS. 23 and 24 are screen shots of examples of a task operation regarding a user's housing status that can be implemented within one or more embodiments of the present invention.

As shown in FIG. 23, in the screen shot 2300, a question 2301 regarding the user's housing status is displayed to the user. If the user is a homeowner, then a plurality of recommendations 2302 are displayed to the user including recommendation to store a copy of mortgage documents or homeowner's insurance policy, for example.

Figure 24:
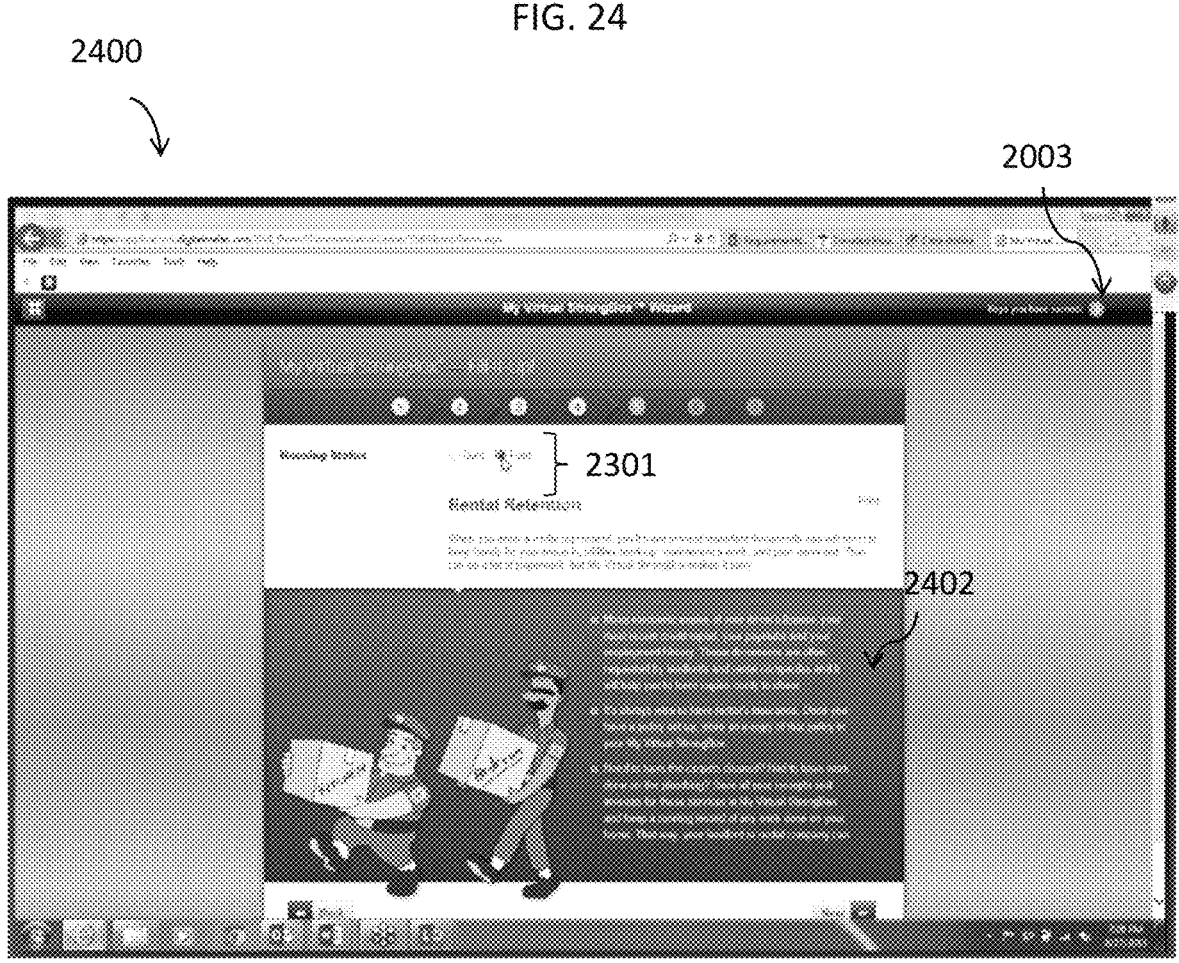

As shown in FIG. 24, in the screen shot 2400, if the user is a renter, a plurality of recommendations 2402 are displayed to the user, including for example, storing of electronic copies of the user's driver license, credit report, paystubs, and employment history, and renter's insurance.

Figure 25:
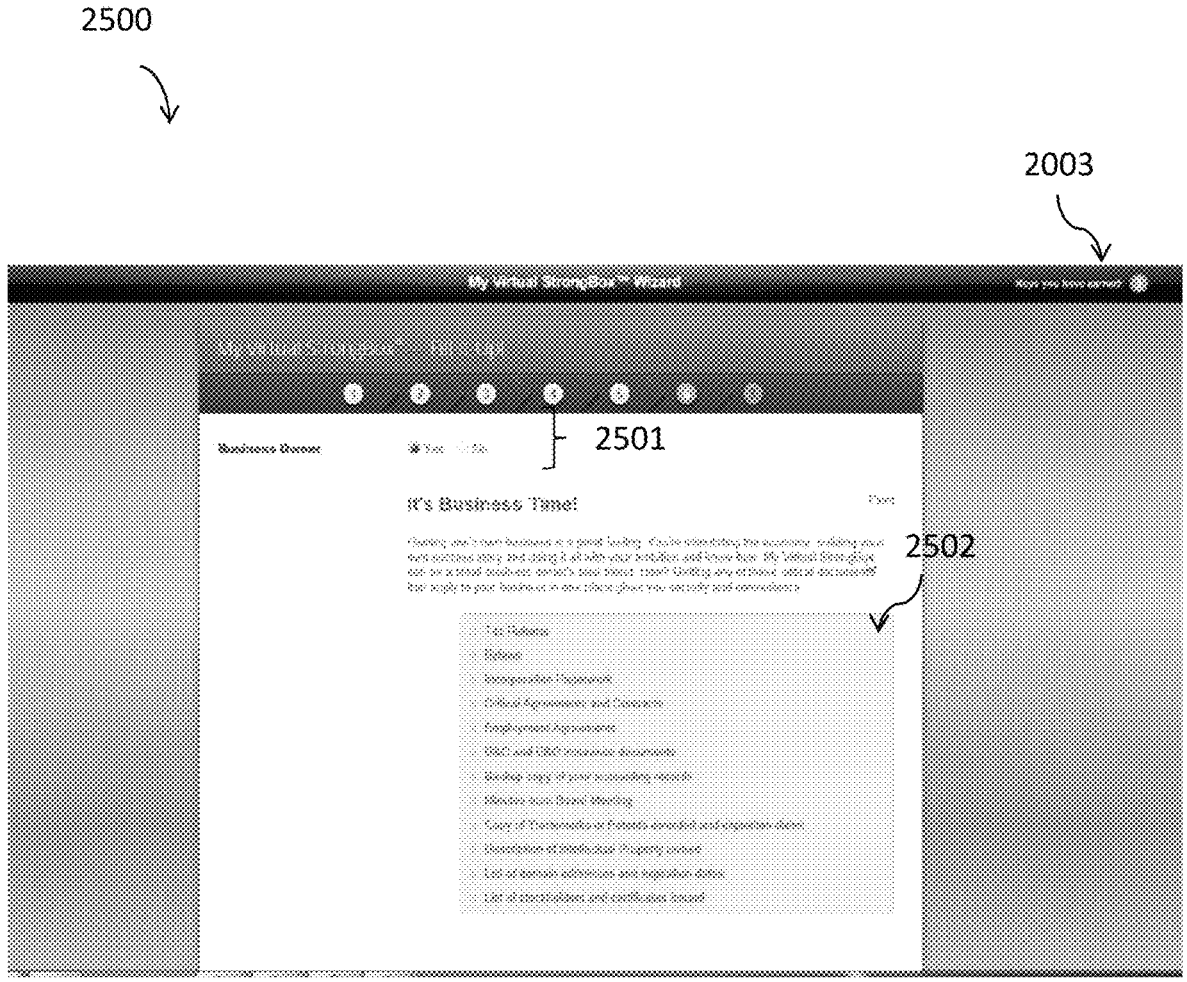
FIG. 25 is a screen shot of an example of a task operation regarding a user's business ownership status that can be implemented within one or more embodiments of the present invention.

As shown in FIG. 25, in the screen shot 2500, a question 2501 is displayed to the user regarding business ownership. If the user is a business owner, a plurality of recommendations 2502 are displayed to the user including, for example, storing of tax returns, bylaws, employment agreements, and intellectual property assets of the business.

According to one or more embodiments of the present invention, the user is not limited to any particular number or type of questions to be answered, or any particular number or type of recommendations to be provided corresponding to the user's answers to the questions.

Figure 26:
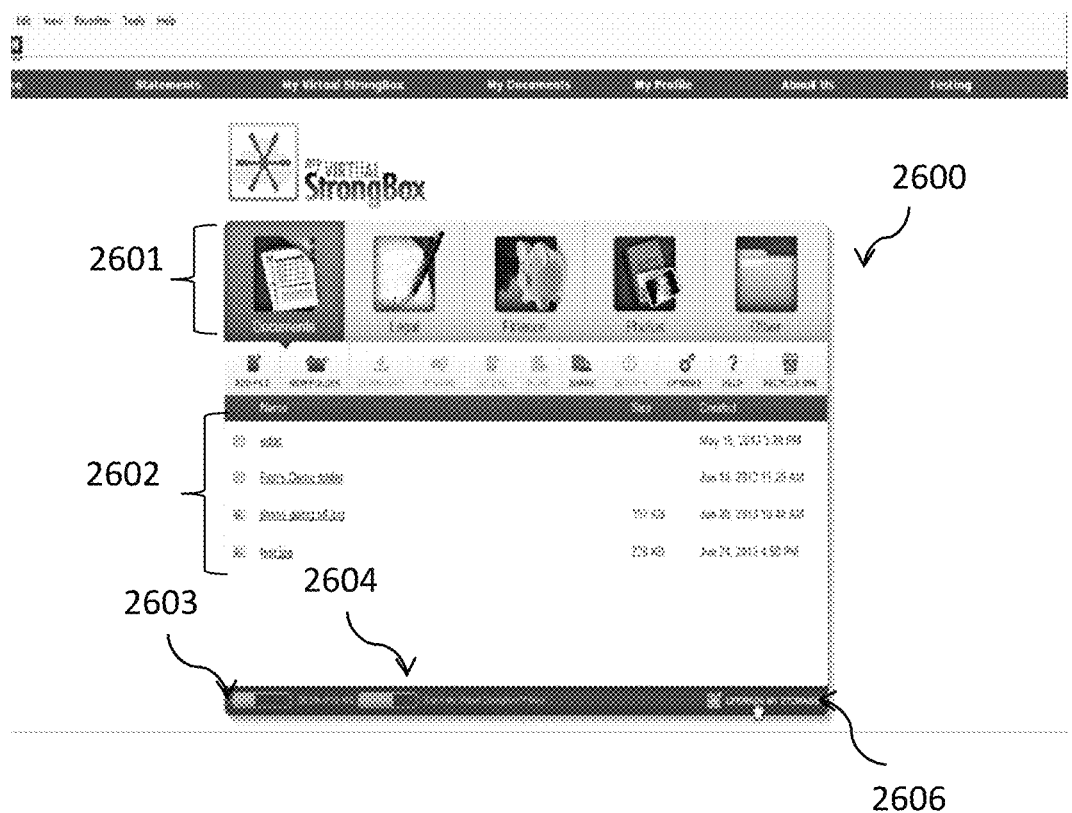
FIG. 26 is a screen shot of the reward system within the virtual storage system, based on completion of the task operations shown in FIGS. 20 through 25 that can be implemented within one or more embodiments of the present invention.

As shown in FIG. 26, in screen shot 2600, upon accessing the virtual storage system 100, the user is able to view the plurality of electronic folders 2601 therein and the electronic documents 2602 stored in each electronic folder 2601. Further, a storage space indicator 2603 indicates an amount of storage space occupied by the user. Further, a points/keys indicator 2604 indicates a total number of points or keys earned by the user.

Further as shown in FIG. 26, a reward option indicator 2606 is displayed to the user. According to one or more embodiments of the present invention, the reward option indicator 2606 is related to a purchase option for purchasing additional storage space (as depicted in FIG. 27). However, the present invention is not limited hereto any type of reward option may be implemented within the reward system according to embodiments of the present invention.

Figure 27:
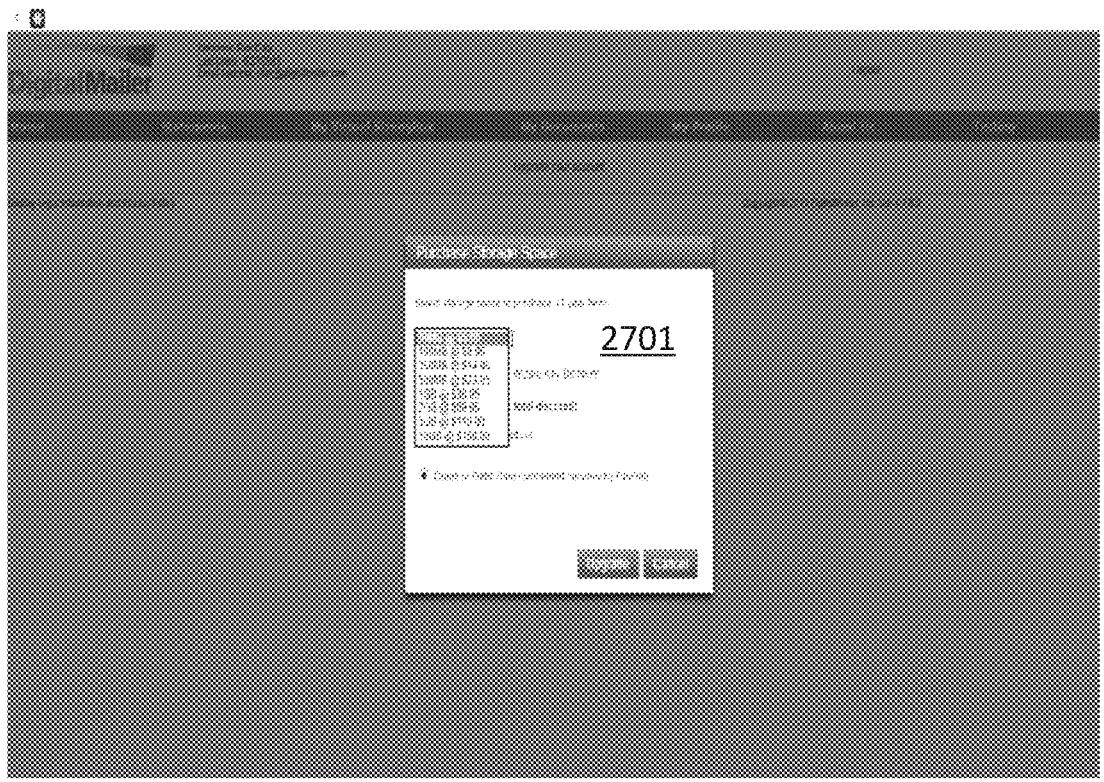
FIG. 27 is a screen shot of an example of a reward redemption operation (i.e., discounted storage space purchase operation) of the method for the reward system shown in FIG. 8 that can be implemented within one or more embodiments of the present invention.

As shown in FIG. 27, in screen shot 2700, one example of a reward option is provided. If the user selects the reward option 2606 of FIG. 26, a reward window (e.g., a purchase storage space window 2701) is displayed to the user. The user is able to select an amount of storage space to purchase at a discounted purchase price. The discounted purchase price is based on the number of points or keys accumulated by the user.

In view of the above, the present method embodiments may therefore take the form of a computer or controller implemented processes and apparatuses for practicing those processes. This disclosure can also be embodied in the form of computer program code containing instructions embodied in tangible media, such as floppy diskettes, CD ROMs, hard drives, or any other computer-readable storage medium, wherein, when the computer program code is loaded into and executed by a computer or controller, the computer becomes an apparatus for practicing the invention. This disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above.

According to one or more embodiments, an educational guide module for a virtual storage system in data communication with a user computing device via a communication network, the virtual storage system comprising at least one processor configured to receive from the user computing device, a selection of at least one of an education guide or a reward system corresponding to the virtual storage system, as input by a user, perform at least one instructional guide operation to instruct the user on operation of the virtual storage system, when the education guide is selected, and perform a reward operation to provide a reward to the user when the reward system is selected, wherein performance of the reward operation includes displaying at least one question to the user, receiving information input by the user as an answer to the at least one question, storing the information received, and calculating points based on the information received, and wherein the points are used to redeem a reward within the virtual storage system.

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. An interactive educational guide module for a virtual storage system in data communication with a user computing device via a communication network, the virtual storage system comprising:
a web interface for interfacing with an external system over the communication network, providing a secure connection to the virtual storage system, and authenticating the external system and a user to enable the user via the external system to access the virtual storage system, wherein the virtual storage system encrypts each electronic document as it is retrieved from the external system, leaving ownership of each electronic document within the virtual storage system with the user at all times;
at least one processor configured to:
receive from the user computing device, a selection of at least one of an education guide or a reward system corresponding to the virtual storage system, as input by the user at the user computing device,
perform at least one instructional guide operation to instruct the user about operation of the virtual storage system, when the education guide is selected, wherein the at least one instructional guide operation comprises instructions for at least one of sharing an electronic document within the virtual storage system with a third party, or sharing access to the virtual storage system with the third party, wherein the sharing an electronic document within the virtual storage system or the access to the virtual storage system comprises:
creating a share link to the electronic document within the virtual storage system or a share link to the access to the virtual storage system, wherein the share link enables the third party to access the electronic document or the virtual storage system, and
determining an expiration period for the share link to the electronic document or to the access to the virtual storage system, wherein the expiration period adjusts how long the share link allows access to the electronic document or the virtual storage system,
control an operation of the virtual storage system in response to an input from the user via the user computing device while performing the at least one instructional guide operation, wherein the input from the user via the user computing device indicates the user's selection to perform the operation of the virtual storage system in accordance with the at least one instructional guide operation, calculate education guide points for the user, upon completing the at least one instructional guide operation within the virtual storage system, perform a reward operation to provide a reward to the user when the reward system is selected, wherein performance of the reward operation comprises:

displaying, via the user computing device, at least one question to the user, the at least one question including the user's family status, housing status, or business status, receiving, via the user computing device, information input by the user as an answer to the at least one question, processing, via the at least one processor, the information received, determining a type of an electronic document for the reward operation based on a context of the processed information, generating and displaying a plurality of operations, the plurality of operations being tasks for using the determined type of the electronic document and performed within the virtual storage system, and calculating, via the at least one processor, reward operation points upon completing at least one of the plurality of operations, wherein the education guide points and reward operation points are used to redeem a reward within the virtual storage system, and wherein the educational guide module and the reward system are accessible via the user computing device within the virtual storage system; and a system memory and a plurality of physical redundant storage devices, the system memory configured to store the electronic document, the access to the virtual storage system, and the share link to the electronic document or the access created, and each of the plurality of physical redundant storage devices configured to store, in a redundant manner, the electronic document, the access to the virtual storage system, and the share link to the electronic document or the access created stored in the system memory via mirroring the system memory or remote copy, thereby enabling the electronic document, the access to the virtual storage system, and the share link to the electronic document or the access created to be duplicated and preventing data loss.

2. The educational guide module of claim 1, wherein the virtual storage system is configured to:

retrieve, via the system memory, the educational guide module from one of the physical redundant storage devices and load the education guide and the reward system into the at least one processor for processing and performance thereof.

3. The educational guide module of claim 2, wherein the educational guide module is a software module stored on one of the physical redundant storage devices.

4. The educational guide module of claim 1, wherein the reward is a discount for purchasing storage space within the virtual storage system.

5. An interactive method implemented by a computer system to effect the implementation of an educational guide module within a virtual storage system including at least one processor in data communication via a communication network with a user computing device, a system memory, and a plurality of physical redundant storage devices, the method comprising:

interfacing with an external system via a web interface over the communication network, providing a secure connection to the virtual storage system, and authenticating via the web interface the external system and a user to enable the user via the external system to access the virtual storage system, wherein the virtual storage system encrypts each electronic document as it is retrieved from the external system, leaving ownership of each electronic document within the virtual storage system with the user at all times;

receiving via the at least one processor, a selection of at least one of an education guide or a reward system corresponding to the virtual storage system, as input by the user at the user computing device;

performing at least one instructional guide operation to instruct the user about operation of the virtual storage system, when the education guide is selected, wherein the at least one instructional guide operation comprises instructions for at least one of sharing an electronic document within the virtual storage system with a third party, or sharing access to the virtual storage system with the third party, wherein the sharing an electronic document within the virtual storage system or the access to the virtual storage system comprises:

creating a share link to the electronic document within the virtual storage system or a share link to the access to the virtual storage system, wherein the share link enables the third party to access the electronic document or the virtual storage system; and determining an expiration period for the share link to the electronic document or to the access to the virtual storage system, wherein the expiration period adjusts how long the share link allows access to the electronic document or the virtual storage system;

controlling an operation of the virtual storage system in response to an input from the user via the user computing device while performing the at least one instructional guide operation, wherein the input from the user via the user computing device indicates the user's selection to perform the operation of the virtual storage system in accordance with the at least one instructional guide operation;

calculating, via the at least one processor, one or more education guide points for the user, upon completing the at least one instructional guide operation within the virtual storage system; and performing a reward operation to provide a reward to the user when the reward system is selected, wherein performing a reward operation comprises:

displaying, via the user computing device, at least one question to the user, the at least one question including the user's family status, housing status, or business status;

receiving, via the user computing device, information input by the user as an answer to the at least one question;

processing, via the at least one processor, the information received;

determining a type of an electronic document for the reward operation based on a context of the processed information;

generating and displaying a plurality of operations, the plurality of operations being tasks for using the determined type of the electronic document and performed within the virtual storage system based on a context of the information processed; and calculating, via the at least one processor, reward operation points upon completing at least one of the plurality of operations, wherein the education guide points and reward operation points are used to redeem a reward within the virtual storage system, wherein the educational guide module and the reward system are accessible via the user computing device within the virtual storage system, and wherein the system memory is configured to store the electronic document, the access to the virtual storage system, and the share link to the electronic document or the access created, and each of the plurality of physical redundant storage devices is configured to store, in a redundant manner, the electronic document, the access to the virtual storage system, and the share link to the electronic document or the access created stored in the system memory via mirroring the system memory or remote copy, thereby enabling the electronic document, the access to the virtual storage system, and the share link to the electronic document or the access created to be duplicated and preventing data loss.

6. The method of claim 5, wherein the reward is a discount for purchasing storage space within the virtual storage system.

7. A non-transitory computer readable medium storing computer executable instructions that, when executed, cause a computing device to perform an interactive method of implementing an educational guide module within a virtual storage system including at least one processor in data communication via a communication network with a user computing device, a system memory, and a plurality of physical redundant storage devices, the method comprising:

interfacing via a web interface with an external system over the communication network, providing a secure connection to the virtual storage system, and authenticating the external system and a user to enable the user via the external system to access the virtual storage system, wherein the virtual storage system encrypts each electronic document as it is retrieved from the external system, leaving ownership of each electronic document within the virtual storage system with the user at all times;

receiving via the at least one processor, a selection of at least one of an education guide or the reward system corresponding to the virtual storage system, as input by the user at the user computing device;

performing at least one instructional guide operation to instruct the user about operation of the virtual storage system, when the education guide is selected, wherein the at least one instructional guide operation comprises instructions for at least one of sharing an electronic document within the virtual storage system with a third party, or sharing access to the virtual storage system with the third party, wherein the sharing an electronic document within the virtual storage system or the access to the virtual storage system comprises:

creating a share link to the electronic document within the virtual storage system or a share link to the access to the virtual storage system, wherein the share link enables the third party to access the electronic document or the virtual storage system, and determining an expiration period for the share link to the electronic document or to the access to the virtual storage system, wherein the expiration period adjusts how long the share link allows access to the electronic document or the virtual storage system;

controlling an operation of the virtual storage system in response to an input from the user via the user computing device while performing the at least one instructional guide operation, wherein the input from the user via the user computing device indicates the user's selection to perform the operation of the virtual storage system in accordance with the at least one instructional guide operation;

calculating, via the at least one processor, education guide points for the user, upon completing the at least one instructional guide operation within the virtual storage system; and performing a reward operation to provide a reward to the user when the reward system is selected, wherein performing a reward operation comprises:

displaying, via the user computing device, at least one question to the user, the at least one question including the user's family status, housing status, or business status;

receiving, via the user computing device, information input by the user as an answer to the at least one question;

processing, via the at least one processor, the information received;

determining a type of an electronic document for the reward operation based on a context of the processed information;

generating and displaying a plurality of operations, the plurality of operations being tasks for using the determined type of the electronic document and performed within the virtual storage system based on a context of the information processed; and calculating, via the at least one processor, reward operation points upon completing at least one of the plurality of operations, wherein the education guide points and reward operation points are used to redeem a reward within the virtual storage system;

wherein the educational guide module and the reward system are accessible via the user computing device within the virtual storage system, and wherein the system memory is configured to store the electronic document, the access to the virtual storage system, and the share link to the electronic document or the access created, and each of the plurality of physical redundant storage devices is configured to store, in a redundant manner, the electronic document, the access to the virtual storage system, and the share link to the electronic document or the access created stored in the system memory via mirroring the system memory or remote copy, thereby enabling the electronic document, the access to the virtual storage system, and the share link to the electronic document or the access created to be duplicated and preventing data loss.

8. The non-transitory computer readable medium of claim 7, wherein the reward is a discount for purchasing storage space within the virtual storage system.

9. The educational guide module of claim 1, wherein the at least one instructional guide operation further comprises instructions for at least one of uploading an electronic document into the virtual storage system, deleting an electronic document from the virtual storage system, creating an electronic folder within the virtual storage system, renaming an electronic document within the virtual storage system, or moving an electronic document within the virtual storage system.

* * * * *